United States Patent
Kato et al.

(10) Patent No.: US 10,813,717 B2
(45) Date of Patent: Oct. 27, 2020

(54) DENTAL TREATMENT APPARATUS AND METHOD OF DRIVING THE SAME

(71) Applicant: J. MORITA MFG. CORP., Kyoto (JP)

(72) Inventors: Kyohei Kato, Kyoto (JP); Tomoaki Ueda, Kyoto (JP); Seiichiro Yamashita, Kyoto (JP); Kazunari Matoba, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 108 days.

(21) Appl. No.: 15/461,807

(22) Filed: Mar. 17, 2017

(65) Prior Publication Data

US 2017/0265961 A1 Sep. 21, 2017

(30) Foreign Application Priority Data

Mar. 17, 2016 (JP) .................................. 2016-053740
Mar. 10, 2017 (JP) .................................. 2017-045774

(51) Int. Cl.
*A61C 1/00* (2006.01)
*A61C 5/40* (2017.01)
(Continued)

(52) U.S. Cl.
CPC ................ *A61C 1/003* (2013.01); *A61C 3/02* (2013.01); *A61C 5/40* (2017.02); *A61C 5/42* (2017.02);
(Continued)

(58) Field of Classification Search
CPC .. A61C 1/003; A61C 5/40; A61C 5/42; A61C 5/44; A61C 3/02; A61C 19/041; A61C 19/042
See application file for complete search history.

(56) References Cited

U.S. PATENT DOCUMENTS 5,980,248 A 11/1999 Kusakabe et al.
6,293,795 B1 * 9/2001 Johnson .............. A61C 1/0015
433/102
(Continued)

FOREIGN PATENT DOCUMENTS

EP 2201907 A1 6/2010
EP 2636384 A1 9/2013
(Continued)

OTHER PUBLICATIONS

Extended European Search Report issued in counterpart European Patent Application No. 17161374.8, dated Jul. 24, 2017 (9 pages).
(Continued)

*Primary Examiner* — Cris L. Rodriguez
*Assistant Examiner* — Hao D Mai
(74) *Attorney, Agent, or Firm* — Osha Liang LLP

(57) ABSTRACT

In a dental treatment apparatus, a control circuit controls a drive motor in accordance with a drive sequence. The drive sequence includes a plurality of drive patterns and at least one of the plurality of drive patterns is different from other drive pattern. The plurality of drive patterns include at least one drive pattern having such drive that a cutting tool is rotated in a cutting direction for cutting a treatment portion and drive for rotating the cutting tool in a non-cutting direction which is reverse to the cutting direction.

17 Claims, 16 Drawing Sheets

(51) Int. Cl.
*A61C 5/44* (2017.01)
*A61C 5/42* (2017.01)
*A61C 3/02* (2006.01)
*A61C 19/04* (2006.01)

(52) U.S. Cl.
CPC .............. *A61C 5/44* (2017.02); *A61C 19/041* (2013.01); *A61C 19/042* (2013.01)

(56) References Cited

U.S. PATENT DOCUMENTS

| | | | | |
|---|---|---|---|---|
| 9,844,418 | B2* | 12/2017 | Ramos | .................... A61C 1/003 |
| 2002/0064756 | A1* | 5/2002 | Pagnini | .................. A61C 1/003 433/102 |
| 2002/0182564 | A1* | 12/2002 | Katsuda | ............... A61C 1/0015 433/98 |
| 2005/0042572 | A1* | 2/2005 | Katsuda | ............... A61C 1/0015 433/98 |
| 2010/0161955 | A1 | 6/2010 | Helfenbein et al. | |
| 2012/0122055 | A1* | 5/2012 | Ramos | .................... A61C 1/003 433/102 |
| 2013/0224677 | A1* | 8/2013 | Yamashita | ........... A61C 19/042 433/27 |
| 2013/0224678 | A1* | 8/2013 | Yamashita | ........... A61C 19/041 433/27 |
| 2015/0086937 | A1 | 3/2015 | Katsuda et al. | |
| 2015/0086941 | A1 | 3/2015 | Katsuda et al. | |

FOREIGN PATENT DOCUMENTS

| | | |
|---|---|---|
| EP | 2851035 A1 | 3/2015 |
| JP | 3264607 B2 | 3/2002 |
| JP | 3283181 B2 | 5/2002 |
| JP | 2003-504113 A | 2/2003 |
| JP | 2015-58274 A | 3/2015 |
| JP | 2015-083116 A | 4/2015 |
| WO | 2001/003601 A1 | 1/2001 |
| WO | 2010/109464 A2 | 9/2010 |

OTHER PUBLICATIONS

Notice of Reasons for Refusal issued in Japanese Application No. 2017-045774, dated May 15, 2018 (11 pages).
11otice of Grounds of Rejection issued in Japanese Application No. 2017-045774, dated Jan. 22, 2019 (12 pages).

* cited by examiner

FIG.11

| M7 | | SET 1 | → | | SET 2 |
|---|---|---|---|---|---|
| | ANGLE OF CUTTING ROTATION $\alpha_1$ | 180° | | $\alpha_2$ | 90° |
| | ANGLE OF NON-CUTTING ROTATION $\beta_1$ | 90° | | $\beta_2$ | 180° |
| | THE NUMBER OF CUTTING ROTATIONS $N_1$ | 100rpm | | $N_3$ | 100rpm |
| | THE NUMBER OF NON-CUTTING ROTATIONS $N_2$ | 300rpm | | $N_4$ | 300rpm |
| | THE NUMBER OF TIMES OF REPETITION n | 5 | | n | 5 |

| M8 | | SET 1 | → | | SET 2 |
|---|---|---|---|---|---|
| | ANGLE OF CUTTING ROTATION $\alpha_1$ | 180° | | $\alpha_2$ | 60° |
| | ANGLE OF NON-CUTTING ROTATION $\beta_1$ | 90° | | $\beta_2$ | 60° |
| | THE NUMBER OF CUTTING ROTATIONS $N_1$ | 300rpm | | $N_3$ | 300rpm |
| | THE NUMBER OF NON-CUTTING ROTATIONS $N_2$ | 300rpm | | $N_4$ | 300rpm |
| | THE NUMBER OF TIMES OF REPETITION n | 1 | | n | 1 |

| M9 | | SET 1 | → | | SET 2 |
|---|---|---|---|---|---|
| | ANGLE OF CUTTING ROTATION $\alpha_1$ | 180° | | $\alpha_2$ | 60° |
| | ANGLE OF NON-CUTTING ROTATION $\beta_1$ | 90° | | $\beta_2$ | 60° |
| | THE NUMBER OF CUTTING ROTATIONS $N_1$ | 300rpm | | $N_3$ | 300rpm |
| | THE NUMBER OF NON-CUTTING ROTATIONS $N_2$ | 300rpm | | $N_4$ | 300rpm |
| | THE NUMBER OF TIMES OF REPETITION n | 1 | | n | 5 |

| M10 | | SET 1 | → | | SET 2 |
|---|---|---|---|---|---|
| | ANGLE OF CUTTING ROTATION $\alpha_1$ | 180° | | $\alpha_2$ | 60° |
| | ANGLE OF NON-CUTTING ROTATION $\beta_1$ | 90° | | $\beta_2$ | 60° |
| | THE NUMBER OF CUTTING ROTATIONS $N_1$ | 300rpm | | $N_3$ | 300rpm |
| | THE NUMBER OF NON-CUTTING ROTATIONS $N_2$ | 300rpm | | $N_4$ | 300rpm |
| | THE NUMBER OF TIMES OF REPETITION n | 2 | | n | 1 |

| M11 | | SET 1 | → | | SET 2 |
|---|---|---|---|---|---|
| | ANGLE OF CUTTING ROTATION $\alpha_1$ | 180° | | $\alpha_2$ | 60° |
| | ANGLE OF NON-CUTTING ROTATION $\beta_1$ | 90° | | $\beta_2$ | 60° |
| | THE NUMBER OF CUTTING ROTATIONS $N_1$ | 300rpm | | $N_3$ | 300rpm |
| | THE NUMBER OF NON-CUTTING ROTATIONS $N_2$ | 300rpm | | $N_4$ | 300rpm |
| | THE NUMBER OF TIMES OF REPETITION n | 2 | | n | 5 |

| M12 | | SET 1 | → | | SET 2 |
|---|---|---|---|---|---|
| | ANGLE OF CUTTING ROTATION $\alpha_1$ | 180° | | $\alpha_2$ | 90° |
| | ANGLE OF NON-CUTTING ROTATION $\beta_1$ | 90° | | $\beta_2$ | 180° |
| | THE NUMBER OF CUTTING ROTATIONS $N_1$ | 300rpm | | $N_3$ | 300rpm |
| | THE NUMBER OF NON-CUTTING ROTATIONS $N_2$ | 300rpm | | $N_4$ | 300rpm |
| | THE NUMBER OF TIMES OF REPETITION n | 10 | | n | 5 |

| | SET 1 | | | SET 2 |
|---|---|---|---|---|
| ANGLE OF CUTTING ROTATION $\alpha_1$ | 180° | | $\alpha_2$ | 0° |
| ANGLE OF NON-CUTTING ROTATION $\beta_1$ | 90° | | $\beta_2$ | 360° |
| THE NUMBER OF CUTTING ROTATIONS $N_1$ | 300rpm | | $N_3$ | 0rpm |
| THE NUMBER OF NON-CUTTING ROTATIONS $N_2$ | 300rpm | | $N_4$ | 300 or 500rpm |
| THE NUMBER OF TIMES OF REPETITION n | 5 | | n | 1 |

M14

| | SET 1 | | | SET 2 |
|---|---|---|---|---|
| ANGLE OF CUTTING ROTATION $\alpha_1$ | 180° | | $\alpha_2$ | 90° |
| ANGLE OF NON-CUTTING ROTATION $\beta_1$ | 90° | | $\beta_2$ | 180° |
| THE NUMBER OF CUTTING ROTATIONS $N_1$ | 300rpm | | $N_3$ | 300rpm |
| THE NUMBER OF NON-CUTTING ROTATIONS $N_2$ | 300rpm | | $N_4$ | 300rpm |
| THE NUMBER OF TIMES OF REPETITION n | 2 | | n | 1 |

M15

| | SET 1 | | | SET 2 |
|---|---|---|---|---|
| ANGLE OF CUTTING ROTATION $\alpha_1$ | 180° | | $\alpha_2$ | 90° |
| ANGLE OF NON-CUTTING ROTATION $\beta_1$ | 90° | | $\beta_2$ | 180° |
| THE NUMBER OF CUTTING ROTATIONS $N_1$ | 300rpm | | $N_3$ | 300rpm |
| THE NUMBER OF NON-CUTTING ROTATIONS $N_2$ | 300rpm | | $N_4$ | 300rpm |
| THE NUMBER OF TIMES OF REPETITION n | 5 | | n | 2 |

M16

| | SET 1 | | | SET 2 | | | SET 3 | | | SET 4 |
|---|---|---|---|---|---|---|---|---|---|---|
| ANGLE OF CUTTING ROTATION $\alpha_1$ | 180° | | $\alpha_2$ | 90° | | $\alpha_3$ | 180° | | $\alpha_4$ | 90° |
| ANGLE OF NON-CUTTING ROTATION $\beta_1$ | 90° | | $\beta_2$ | 180° | | $\beta_3$ | 90° | | $\beta_4$ | 90° |
| THE NUMBER OF CUTTING ROTATIONS $N_1$ | 300rpm | | $N_3$ | 300rpm | | $N_5$ | 300rpm | | $N_7$ | 300rpm |
| THE NUMBER OF NON-CUTTING ROTATIONS $N_2$ | 300rpm | | $N_4$ | 300rpm | | $N_6$ | 300rpm | | $N_8$ | 300rpm |
| THE NUMBER OF TIMES OF REPETITION n | 2 | | n | 1 | | n | 2 | | n | 1 |

M17

| | SET 1 | | | SET 2 |
|---|---|---|---|---|
| ANGLE OF CUTTING ROTATION $\alpha_1$ | 90° | | $\alpha_2$ | 45° |
| ANGLE OF NON-CUTTING ROTATION $\beta_1$ | 90° | | $\beta_2$ | 0° |
| THE NUMBER OF CUTTING ROTATIONS $N_1$ | 300rpm | | $N_3$ | 300rpm |
| THE NUMBER OF NON-CUTTING ROTATIONS $N_2$ | 300rpm | | $N_4$ | 0rpm |
| THE NUMBER OF TIMES OF REPETITION n | 1 | | n | 1 |

M18

| | SET 1 | | | SET 2 |
|---|---|---|---|---|
| ANGLE OF CUTTING ROTATION $\alpha_1$ | 90° | | $\alpha_2$ | 45° |
| ANGLE OF NON-CUTTING ROTATION $\beta_1$ | 90° | | $\beta_2$ | 0° |
| THE NUMBER OF CUTTING ROTATIONS $N_1$ | 300rpm | | $N_3$ | 300rpm |
| THE NUMBER OF NON-CUTTING ROTATIONS $N_2$ | 300rpm | | $N_4$ | 0rpm |
| THE NUMBER OF TIMES OF REPETITION n | 2 OR MORE | | n | 1 |

M19

| | SET 1 | | | SET 2 |
|---|---|---|---|---|
| ANGLE OF CUTTING ROTATION $\alpha_1$ | 180° | | $\alpha_2$ | 180° |
| ANGLE OF NON-CUTTING ROTATION $\beta_1$ | 180° | | $\beta_2$ | 270° |
| THE NUMBER OF CUTTING ROTATIONS $N_1$ | 100rpm | | $N_3$ | 100rpm |
| THE NUMBER OF NON-CUTTING ROTATIONS $N_2$ | 100rpm | | $N_4$ | 100rpm |
| THE NUMBER OF TIMES OF REPETITION n | 1 | | n | 1 |

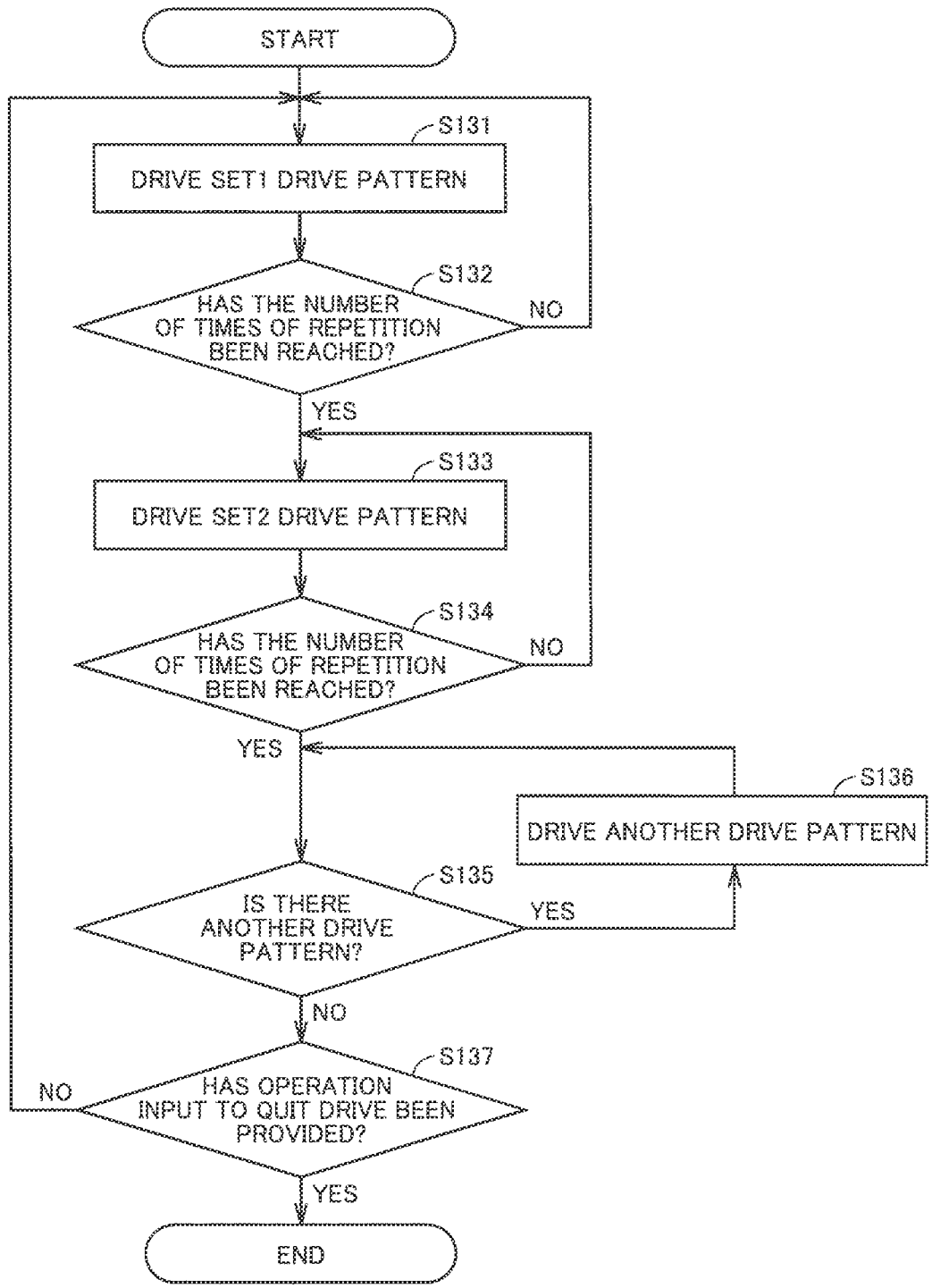

DENTAL TREATMENT APPARATUS AND METHOD OF DRIVING THE SAME

BACKGROUND OF THE INVENTION

Field of the Invention

The present invention relates to a dental treatment apparatus including a handpiece and particularly to a dental treatment apparatus cutting an inner wall of a root canal of a tooth and enlarging the root canal and a method of driving the same.

Description of the Background Art

In dental treatment, treatment for cutting and enlarging a root canal of a tooth may be performed. In the treatment, a dental treatment apparatus in which a cutting tool called a file or a reamer is attached to a head portion of a handpiece is used and a root canal of a tooth is cut and enlarged by driving the cutting tool. Various types of control (for example, Japanese Patent No. 3264607 (Patent Literature 1), Japanese National Patent Publication No. 2003-504113 (Patent Literature 2), and the like) have been proposed as control for the dental treatment apparatus to drive the cutting tool to cut and enlarge a root canal of a tooth.

In a dental treatment apparatus disclosed in Patent Literature 1, rotation of a cutting tool is controlled to forward rotation (right and clockwise rotation) or reverse rotation (left and counterclockwise rotation) by driving a motor to rotate forward or backward in accordance with a state of a rotate direction switch. The dental treatment apparatus disclosed in Patent Literature 1 includes a load torque detection resistor detecting a load applied to the cutting tool. When the detected load reaches a reference set in advance, the motor is switched from forward rotation to reverse rotation and rotation of the cutting tool is controlled from forward rotation to reverse rotation.

In a dental treatment apparatus disclosed in Patent Literature 2, such control is carried out that a tooth is cut by rotating a cutting tool clockwise by a first angle of rotation and in succession the cutting tool is rotated counterclockwise by a second angle of rotation so as not to positively cut a tooth. In the dental treatment apparatus disclosed in Patent Literature 2, such control is carried out that the first angle of rotation is greater than the second angle of rotation so as to eject a substance from a surface of a root canal as the cutting tool travels through the root canal.

A root canal of a tooth is different in shape or condition from person to person, and in particular different in degree of curve or condition of calcification and clogging from person to person. Therefore, when a conventional dental treatment apparatus is used to drive a cutting tool with a motor for cutting and enlarging a root canal, the cutting tool is driven in a constant pattern regardless of a shape or a condition of the root canal and drive inappropriate for the shape or the condition of the root canal may be performed. When drive is inappropriate, not only efficiency in cutting is poor but also an unnecessary portion may be cut or a load may be imposed on the cutting tool, which leads to failure.

SUMMARY OF THE INVENTION

The present invention provides a dental treatment apparatus driving a cutting tool attached to a head which can appropriately cut a root canal of a tooth regardless of a shape or a condition of the root canal and a method of driving the same.

A dental treatment apparatus according to the present invention includes a handpiece holding a cutting tool in its head in a drivable manner, a drive motor driving the cutting tool held by the head, and a control circuit controlling the drive motor in accordance with a drive sequence. The drive sequence includes a plurality of drive patterns, at least one of the plurality of drive patterns is different from other drive pattern, and the plurality of drive patterns include at least one drive pattern having drive for rotating the cutting tool in a cutting direction for cutting a treatment portion and drive for rotating the cutting tool in a non-cutting direction which is reverse to the cutting direction.

A method of driving a dental treatment apparatus according to the present invention is a method of driving a dental treatment apparatus for driving a cutting tool held by a head of a handpiece. The control circuit drives the cutting tool in accordance with a drive sequence, the drive sequence includes a plurality of drive patterns, at least one of the plurality of drive patterns is different from other drive pattern, and the plurality of drive patterns include at least one drive pattern having drive for rotating the cutting tool in a cutting direction for cutting a treatment portion and drive for rotating the cutting tool in a non-cutting direction which is reverse to the cutting direction.

Another dental treatment apparatus according to the present invention includes a handpiece holding a cutting tool in a head in a drivable manner, a drive motor driving the cutting tool held by the head, and a control circuit controlling the drive motor in accordance with a drive sequence. An angle of rotation of the cutting tool includes an angle of cutting rotation representing rotation of the cutting tool in a cutting direction for cutting a treatment portion and an angle of non-cutting rotation representing rotation of the cutting tool in a non-cutting direction which is reverse to the cutting direction, and the drive sequence includes a plurality of types of the angle of cutting rotation and/or the angle of non-cutting rotation.

Since the dental treatment apparatus according to the present invention controls the drive motor in accordance with a drive sequence in which at least one of a plurality of drive patterns is different from other drive pattern and includes at least one drive pattern having drive for rotating the cutting tool in the cutting direction for cutting a treatment portion and drive for rotating the cutting tool in the non-cutting direction which is reverse to the cutting direction, it has combined functions and can appropriately cut a root canal of a tooth regardless of a shape or a condition of the root canal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing another list of drive sequences controlled by the root canal treatment instrument according to the second embodiment of the present invention.

FIG. 12 is a diagram showing yet another list of drive sequences controlled by the root canal treatment instrument according to the second embodiment of the present invention.

FIG. 13 is a flowchart for illustrating processing for driving a cutting tool 5 in accordance with a drive sequence in the root canal treatment instrument according to the second embodiment of the present invention.

DESCRIPTION OF THE PREFERRED EMBODIMENTS

Overview of the Present Invention

Treatment for cutting and enlarging a root canal of a tooth is very difficult because a degree of curve of a root canal or a condition of calcification and clogging of the root canal is different from person to person. In particular, since a conventional root canal treatment instrument merely drives a cutting tool in a simple rotary motion, cutting and enlargement in conformity with a shape of a root canal cannot be performed or a cutting tool may be broken due to a load applied thereto. For a root canal of a tooth of which cutting and enlargement is difficult with a conventional root canal treatment instrument, an operator has performed cutting and enlargement by operating a cutting tool with his/her hand and fingers.

An operator can perform difficult cutting and enlargement by operating a cutting tool with his/her hand and fingers because he/she operates the cutting tool in accordance with a shape or a condition of a root canal. A root canal treatment instrument according to the present invention, being a root canal treatment instrument driving a cutting tool with a motor, drives the cutting tool with a plurality of drive patterns in conformity with a shape or a condition of a root canal being combined instead of driving the cutting tool in a simple rotary motion.

Initially, drive of a cutting tool can be broken down into five basic drive patterns described below. The root canal treatment instrument according to the present invention drives the cutting tool also based on combination of the five basic drive patterns. Specifically, FIGS. 1A to 1E are diagrams for illustrating basic drive patterns used in the root canal treatment instrument according to the present invention. An arrow shown in FIGS. 1A to 1E indicates a direction of rotation of the cutting tool. FIGS. 1A to 1E show a direction of rotation with a direction from a side of the cutting tool attached to a head toward a tip end of the cutting tool being defined as the reference. Though a normal cutting tool can cut a root canal of a tooth by rotating clockwise, it cannot cut a root canal of a tooth or efficiency in cutting lowers when it rotates counterclockwise. Therefore, a clockwise direction is hereinafter defined as a cutting direction, a counterclockwise direction is defined as a non-cutting direction, an angle of clockwise rotation is defined as an angle of rotation in the cutting direction, and an angle of counterclockwise rotation is defined as an angle of rotation in the non-cutting direction. Though a cutting tool which can cut a root canal of a tooth when it is driven counterclockwise but cannot cut the root canal of the tooth or is lower in efficiency in cutting when it is driven clockwise can also naturally be adopted as a cutting tool 5, relation between the cutting direction and the non-cutting direction is reverse in this case.

Figure 1A:
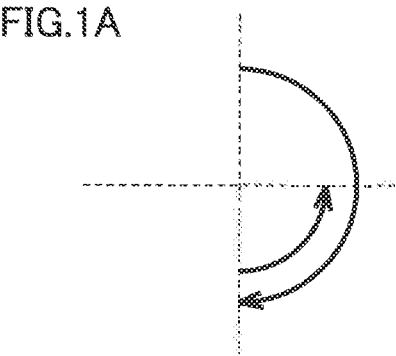
FIGS. 1A to 1E are diagrams for illustrating basic drive patterns used in a root canal treatment instrument according to the present invention.

In the basic drive pattern shown in FIG. 1A, the cutting tool is rotated by 180 degrees in the cutting direction and is rotated by 90 degrees in the non-cutting direction. In the basic drive pattern shown in FIG. 1B, the cutting tool is rotated by 90 degrees in the cutting direction and is rotated by 180 degrees in the non-cutting direction. In the basic drive pattern shown in FIG. 1C, the cutting tool is rotated by 180 degrees in the cutting direction and is rotated by 180 degrees in the non-cutting direction. In the basic drive pattern shown in FIG. 1D, the cutting tool is rotated by 360 degrees in the cutting direction and is rotated by 0 degree in the non-cutting direction. The basic drive pattern shown in FIG. 1D normally shows continuous rotation in the cutting direction and exceptionally includes also rotation by 360 degrees in the cutting direction followed by stop. In the basic drive pattern shown in FIG. 1E, the cutting tool is rotated by 0 degree in the cutting direction and is rotated by 360 degrees in the non-cutting direction. The basic drive pattern shown in FIG. 1E also normally shows continuous rotation in the non-cutting direction and exceptionally includes also rotation by 360 degrees in the non-cutting direction followed by stop.

An angle of rotation shown in the basic drive pattern shown in FIGS. 1A to 1E is by way of example, and in the basic drive pattern shown in FIG. 1A, at least an angle of rotation in the cutting direction should be greater than an angle of rotation in the non-cutting direction. In the basic drive pattern shown in FIG. 1B, at least an angle of rotation in the cutting direction should be smaller than an angle of rotation in the non-cutting direction. In the basic drive pattern shown in FIG. 1C, an angle of rotation in the cutting direction should only be equal to an angle of rotation in the non-cutting direction.

When an operator performs cutting and enlargement by operating the cutting tool with his/her hand and fingers, for example, the operator performs cutting and enlargement while he/she rotates the cutting tool in the cutting direction as in the basic drive pattern shown in FIG. 1A and removes bite of the cutting tool by rotating the cutting tool in the non-cutting direction when he/she feels strong resistance. When the cutting tool comes to a portion where the root canal is greatly curved, the operator makes adjustment such that a degree of cutting is equal between a portion on an inner side and a portion on an outer side of the curved root canal by setting an angle of rotation in the cutting direction to be smaller than an angle of rotation in the non-cutting direction as in the basic drive pattern shown in FIG. 1B.

Figure 2:
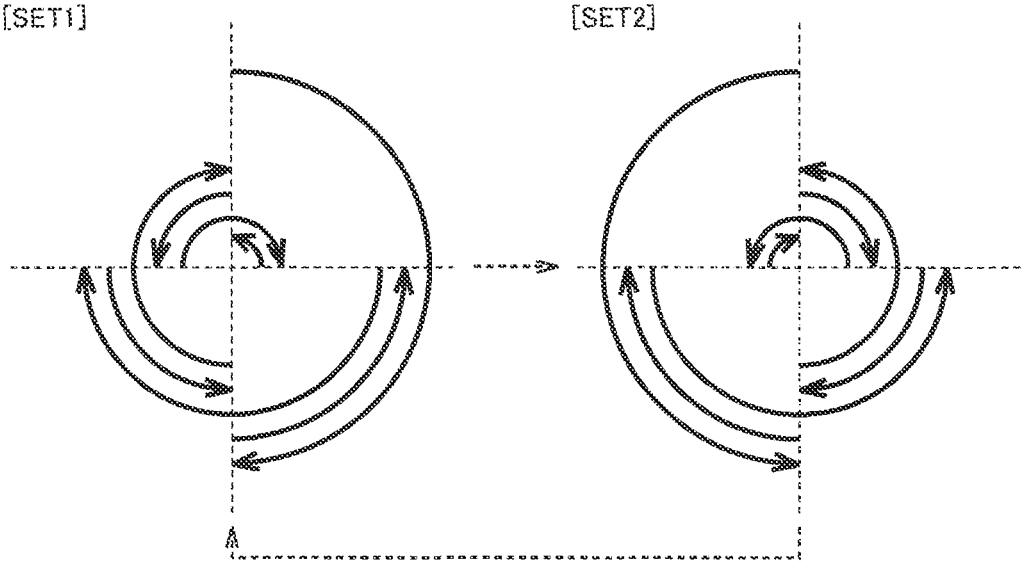
FIG. 2 is a diagram for illustrating one example of a drive sequence used in the root canal treatment instrument according to the present invention.

Instead of the operator switching the basic drive pattern in accordance with a shape or a condition of the root canal, in the root canal treatment instrument according to the present invention, different drive patterns are combined to set one drive sequence in advance so that the cutting tool is driven based on the drive sequence. The drive sequence does not include a sequence in which the same drive pattern is merely repeated. FIG. 2 is a diagram for illustrating one example of the drive sequence used in the root canal treatment instrument according to the present invention. A solid arrow shown in FIG. 2 indicates a direction of rotation of the cutting tool and a dashed arrow indicates repetition of SET (which will be described later) which is combination of drive patterns. FIG. 2 also shows a direction of rotation with the direction from the side of the cutting tool attached to the head toward the tip end of the cutting tool being defined as the reference. Therefore, an arrow in the clockwise direction indicates rotation of the cutting tool in the cutting direction and an arrow in the counterclockwise direction indicates rotation of the cutting tool in the non-cutting direction.

In the present application, the drive pattern includes also a pattern which is combination of basic drive patterns other than the basic drive patterns shown in FIGS. 1A to 1E, which is defined as a drive pattern in a narrow sense.

Figure 1B:
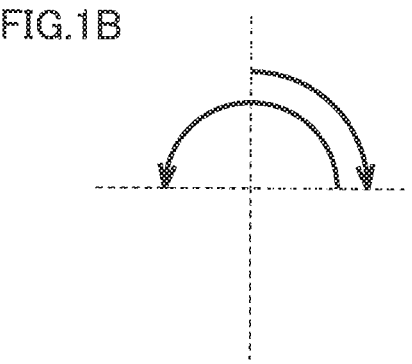
Figure 1C:
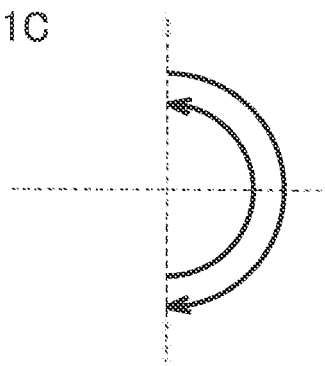

For example, the basic drive pattern alone shown in FIG. 1A or a pattern which is combination of the basic drive pattern shown in FIG. 1A and the basic drive pattern shown in FIG. 1C may be defined as one drive pattern in the narrow sense.

A unit of drive patterns including repetition thereof is defined as a set (SET), which is defined as a drive pattern in a broad sense. For example, repetition four times of the basic drive pattern alone shown in FIG. 1A or repetition three times of a drive pattern which is combination of the basic drive pattern shown in FIG. 1A and the basic drive pattern shown in FIG. 1C is defined as one set (SET).

Combination of two or more different sets (SET) is defined as a drive sequence. The drive sequence is combination of drive patterns in the narrow sense or the broad sense.

A unit of drive patterns including repetition thereof is defined as a set (SET), which is defined as a drive pattern in a broad sense. For example, repetition four times of the basic drive pattern alone shown in FIG. 1A or repetition three times of a drive pattern which is combination of the basic drive pattern shown in FIG. 1A and the basic drive pattern shown in FIG. 1C is defined as one set (SET).

Combination of different sets (SETs) or different drive patterns is defined as the drive sequence. The drive sequence is combination of drive patterns in the narrow sense or the broad sense.

The drive sequence shown in FIG. 2 consists of SET1 and SET2. After SET1 is performed, SET2 is performed. Furthermore, after SET2 is performed, the pattern returns to SET1, and thereafter SET1 and SET2 are alternately repeatedly performed. SET1 includes repetition four times of the basic drive pattern shown in FIG. 1A. In drive under SET1, cutting tool 5 is rotated by 720 degrees in total in the cutting direction and is rotated by 360 degrees in total in the non-cutting direction, and hence cutting tool 5 consequently makes one rotation in the cutting direction. SET2 includes repetition four times of the basic drive pattern shown in FIG. 1B. In drive under SET2, cutting tool 5 is rotated by 360 degrees in total in the cutting direction and is rotated by 720 degrees in total in the non-cutting direction, and hence cutting tool 5 consequently makes one rotation in the non-cutting direction.

Drive under SET2 is a drive pattern in which the cutting tool is rotated by 90 degrees in the cutting direction and is rotated by 180 degrees in the non-cutting direction. Drive under SET2 is a method of cutting and enlargement aiming at cutting and enlargement in particular of a greatly curved root canal such that a portion on an inner side and a portion on an outer side of the curved root canal are equal to each other in degree of cutting. Drive under SET2 is drive called a balanced force technique for the cutting tool to perform cutting and enlargement in conformity with a shape of the root canal.

Thus, in the drive sequence shown in FIG. 2, SET1 is used mainly as a function for cutting and enlarging a root canal and SET2 is used mainly as a function for maintaining a shape of the root canal. In the drive sequence shown in FIG. 2, the cutting tool is rotated also in the non-cutting direction in drive under SET1, and therefore bite of the cutting tool can be prevented and fracture of the cutting tool can also be lessened. In the drive sequence shown in FIG. 2, drive under the balanced force technique which has conventionally selectively been performed by an operator in accordance with a shape or a condition of the root canal is included as one drive pattern in the drive sequence. Therefore, a period during which the cutting tool is driven under the balanced force technique is unexceptionally present during a period of drive in one drive sequence, and hence a root canal of a tooth can appropriately be cut regardless of capability of the operator.

So long as a total of angles of rotation in the cutting direction is the same as a total of angles of rotation in the non-cutting direction in one drive sequence, an equivalent effect can be achieved whether cutting is performed as normal filing or filing in which relation between the cutting direction and the non-cutting direction is reverse.

The basic drive pattern shown in FIG. 1C represents a cutting method in which the cutting tool alternately is rotated by 90 degrees in the cutting direction and by 90 degrees in the non-cutting direction, and it is effective for preparatory enlargement or penetration of a clogged root canal. The basic drive pattern shown in FIG. 1C represents drive called a watch winding technique. When the drive sequence includes the basic drive pattern shown in FIG. 1C, a period during which drive under the watch winding technique is performed is unexceptionally present during a period of drive in one drive sequence, and hence a root canal of a tooth can appropriately be cut regardless of capability of the operator.

The drive sequence shown in FIG. 2 includes a plurality of types of an angle of cutting rotation in the cutting direction and/or an angle of non-cutting rotation in the non-cutting direction. Specifically, the drive sequence shown in FIG. 2 includes a plurality of types of angles in the same direction in such a manner that the cutting tool is rotated by 180 degrees in the cutting direction in drive under SET1 and the cutting tool is rotated by 90 degrees in the cutting direction in drive under SET2. In drive under SET2, an angle of rotation in the cutting direction (90 degrees) is smaller than the angle of rotation in the non-cutting direction (180 degrees).

In treatment of a root canal, it may be necessary to secure a path for entry (which may be called a glide path) by performing cutting in advance with a cutting tool smaller in diameter before a root canal is cut and enlarged with a cutting tool greater in diameter. When the cutting tool smaller in diameter is driven with a motor, the cutting tool is higher in possibility of break than a cutting tool greater in diameter. The root canal treatment instrument according to the present invention includes a drive pattern in which a load applied to the cutting tool is lower (for example, FIG. 1B) in the drive sequence, so that even the cutting tool smaller in diameter can be driven with the motor. Therefore, the root canal treatment instrument according to the present invention can safely and reliably perform cutting for securing a path for entry in advance with a cutting tool smaller in diameter.

In connection with the overview of the present invention described above, further specific embodiments will be described below with reference to the drawings.

First Embodiment

A dental treatment apparatus according to a first embodiment of the present invention is a root canal treatment instrument including a root canal enlargement and root canal length measurement system incorporating a handpiece for dental root canal treatment. The dental treatment apparatus according to the present invention, however, is not limited to the root canal treatment instrument but is applicable to a similarly configured dental treatment apparatus.

[Configuration of Dental Treatment Apparatus]

Figure 3:
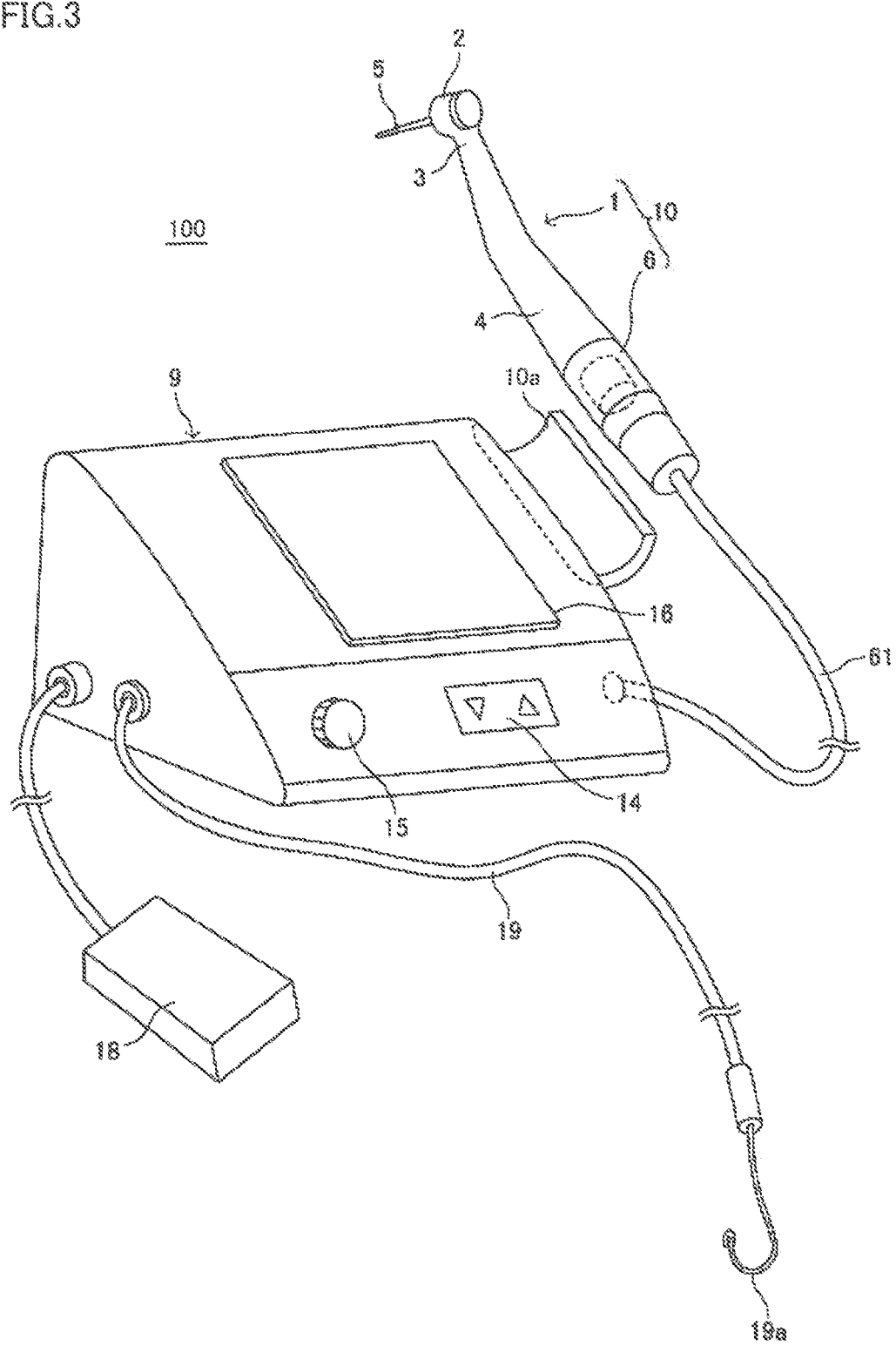
FIG. 3 is a schematic diagram showing a feature of appearance of the root canal treatment instrument according to a first embodiment of the present invention.
Figure 4:
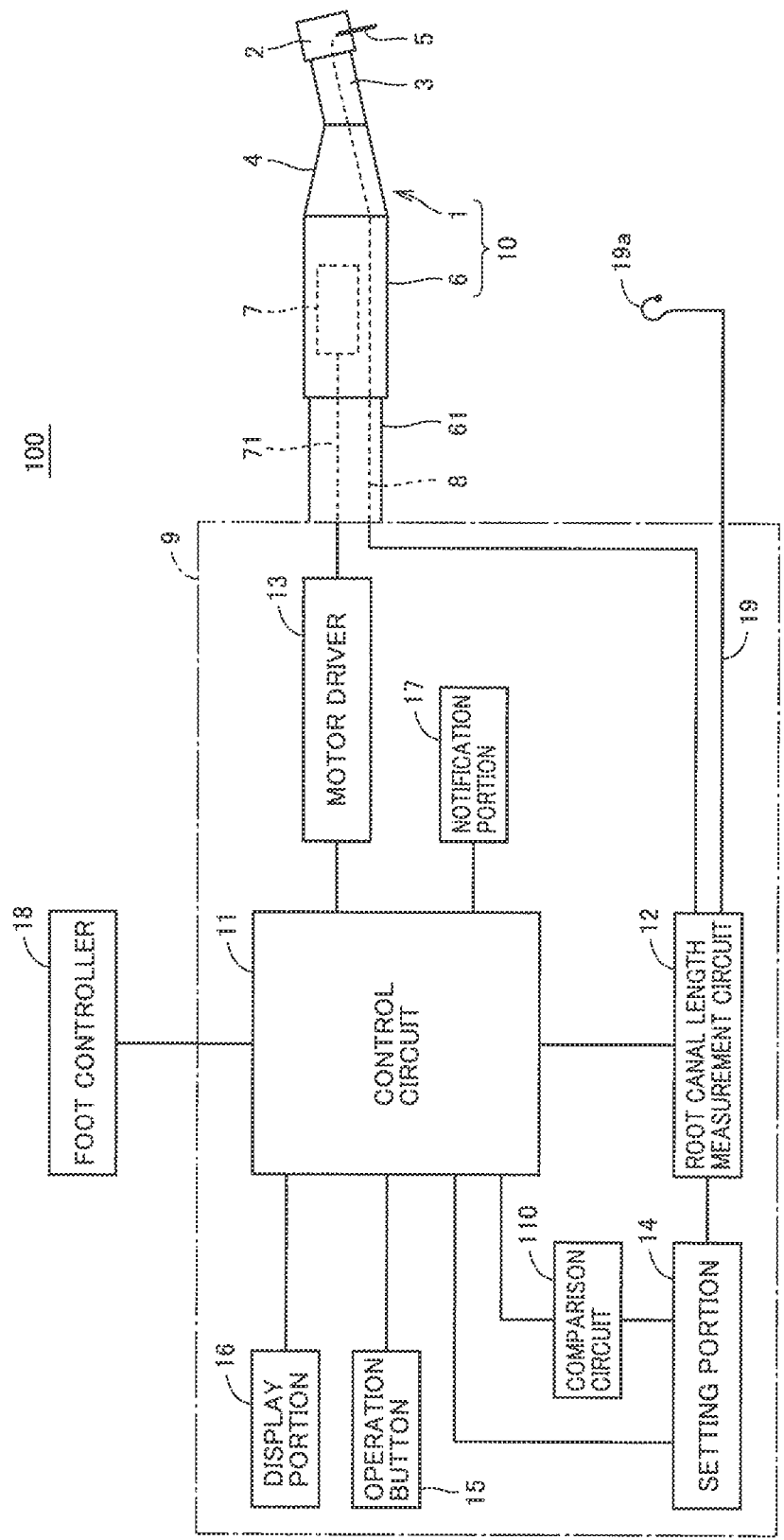
FIG. 4 is a block diagram showing a functional configuration of the root canal treatment instrument according to the first embodiment of the present invention.

FIG. 3 is a schematic diagram showing a feature of appearance of the root canal treatment instrument according to the first embodiment of the present invention. FIG. 4 is a block diagram showing a functional configuration of the root canal treatment instrument according to the first embodiment of the present invention. A root canal treatment instrument 100 shown in FIG. 3 includes a handpiece 1 for dental root canal treatment, a motor unit 6, and a control box 9.

Handpiece 1 for dental root canal treatment includes a head 2, a neck portion 3 small in diameter and continuous to head 2, and a grip portion 4 continuous to neck portion 3 and gripped with fingers. Motor unit 6 for rotatably driving cutting tool 5 (a file or a reamer) held by head 2 is removably connected to a base portion of grip portion 4. A dental instrument 10 is constructed with motor unit 6 being coupled to handpiece 1.

As shown in FIG. 4, motor unit 6 contains a micromotor 7 and is coupled to control box 9 through a power supply lead 71 supplying power to micromotor 7 and a hose 61 containing a signal lead 8 transmitting a signal to a root canal length measurement circuit 12 which will be described later. Signal lead 8 is a part of a conductor electrically connected to cutting tool 5 with motor unit 6 and handpiece 1 being interposed and transmitting an electric signal. Cutting tool 5 serves as one electrode of root canal length measurement circuit 12.

Control box 9 includes a control circuit 11, a comparison circuit 110, a root canal length measurement circuit 12, a motor driver 13, a setting portion 14, an operation button 15, a display portion 16, and a notification portion 17. As shown in FIG. 3, a holder 10a for holding instrument 10 while the instrument is not used is attached to control box 9 in a side portion of a main body. In control box 9, a foot controller 18 is coupled to control circuit 11 and a lead 19 is coupled to root canal length measurement circuit 12. Though lead 19 is pulled out of control box 9, it may be pulled out as being branched from a point intermediate in hose 61. A mouth cavity electrode 19a placed over a lip of a patient is attached to a tip end of lead 19 as being electrically connected. Mouth cavity electrode 19a serves as the other electrode of root canal length measurement circuit 12.

Control portion 11 is responsible for overall control of the root canal enlargement and root canal length measurement system and a main portion thereof is implemented by a microcomputer. Comparison circuit 110, root canal length measurement circuit 12, motor driver 13, setting portion 14, operation button 15, display portion 16, notification portion 17, and foot controller 18 are connected to control circuit 11. Control portion 11 controls a direction of rotation of cutting tool 5 cutting a treatment portion. Specifically, control circuit 11 controls drive to any of forward rotation drive for rotating cutting tool 5 clockwise (also called right rotation), reverse rotation drive for rotating cutting tool 5 counterclockwise (also called left rotation), and twist drive (reciprocal drive) for alternately rotating cutting tool 5 clockwise and counterclockwise. A direction of rotation of the cutting tool (clockwise or counterclockwise) is discussed with the direction from the side of cutting tool 5 attached to head 2 toward the tip end of cutting tool 5 being defined as the reference. Control portion 11 can control drive for rotating cutting tool 5 with parameters including an angle of rotation, a rotation speed, or an angular rotation speed (the number of rotations) in the clockwise direction and an angle of rotation, a rotation speed, or an angular rotation speed (the number of rotations) in the counterclockwise direction being changed.

An angle of rotation may be defined by a time period for rotation (also called a time period for drive) when an angular rotation speed (the number of rotations) is constant. An angle of rotation may be defined by an amount associated with drive of cutting tool 5 such as an amount of a drive current or an amount of torque. Though description will be given below with reference to an angle of rotation, it may be replaced with the number of times of rotation. For example, setting the number of rotations of cutting tool 5 to ½ rotation is the same in meaning as rotation of cutting tool 5 by 180 degrees. Drive of cutting tool 5 for 0.25 second with a rotation speed of cutting tool 5 being constant at 120 rotations per minute is the same in meaning as rotation of cutting tool 5 by 180 degrees. Strictly speaking, for example, correspondence between a time period for rotation in terms of control and an actual angle of rotation may have to be corrected depending on a load applied to the cutting tool or the motor, however, an amount of correction is extremely small and hence it is ignorable in carrying out the present invention. In a subsequent embodiment, a speed of rotation of cutting tool 5 is expressed as the number of rotations. The number of rotations is expressed in a unit of rotations per minute (rpm).

Comparison circuit 110 is necessary for detecting a load applied to cutting tool 5 and can selectively be provided when detection of the load is necessary. Comparison circuit 110 can compare a load at any time point during rotation of cutting tool 5 clockwise or counterclockwise by motor driver 13. Specifically, comparison circuit 110 can compare a load applied to cutting tool 5 with a reference load after cutting tool 5 is rotated by a prescribed angle of rotation (for example, 180 degrees) clockwise or counterclockwise.

Root canal length measurement circuit 12 is necessary for detecting a position of a tip end of cutting tool 5 in a root canal, and can selectively be provided when detection of the position is necessary. Root canal length measurement circuit 12 forms a closed circuit with cutting tool 5 inserted in a root canal of a tooth being defined as one electrode and mouth cavity electrode 19a placed over a lip of a patient being defined as the other electrode. Root canal length measurement circuit 12 can measure a distance from a position of a root apex of a tooth to the tip end of cutting tool 5 by measuring an impedance between cutting tool 5 and mouth cavity electrode 19a by applying a measurement voltage across cutting tool 5 and mouth cavity electrode 19a. When root canal length measurement circuit 12 detects the tip end of cutting tool 5 reaching the position of the root apex, an amount of insertion of the cutting tool, that is, the distance from a mouth of the root canal to the tip end of the cutting tool, can be defined as a root canal length. An electric root canal length measurement method for measuring a root canal length by measuring an impedance between cutting tool 5 and mouth cavity electrode 19a has been known, and all known electric root canal length measurement methods are applicable to root canal treatment instrument 100 according to the first embodiment.

Motor driver 13 is connected to micromotor 7 through power supply lead 71 and controls power supplied to micromotor 7 based on a control signal from control circuit 11. Motor driver 13 can control a direction of rotation, the number of rotations, and an angle of rotation of micromotor 7, that is, a direction of rotation, the number of rotations, and an angle of rotation of cutting tool 5, by controlling power supplied to micromotor 7.

Setting portion 14 sets the reference for controlling a direction of rotation, the number of rotations, and an angle of rotation of cutting tool 5. Setting portion 14 sets a switch criterion to be compared by comparison circuit 110 with a load applied to cutting tool 5 (a criterion for switching a parameter of a drive sequence or a drive pattern), a reference load, and timing. Setting portion 14 can set in advance with root canal length measurement circuit 12, a position of a root apex as the reference position and a position at a prescribed distance from the position of the root apex as a switch position (a criterion for switching a parameter of a drive sequence or a drive pattern). Root canal treatment instrument 100 can change a parameter including a direction of rotation, the number of rotations, and an angle of rotation of cutting tool 5 when the tip end of cutting tool 5 reaches the reference position, by setting the reference position in advance with setting portion 14.

Operation portion 15 sets a parameter including the number of rotations and an angle of rotation of cutting tool 5 and can also set selection as to whether or not to measure a root canal length. Operation portion 15 can allow manual switching between forward rotation drive and reverse rotation drive or switching between forward rotation drive and twist drive.

As will be described later, display portion 16 shows a position of the tip end of cutting tool 5 in a root canal or a direction of rotation, the number of rotations, and an angle of rotation of cutting tool 5. Display portion 16 can also show information given from notification portion 17 to an operator.

Notification portion 17 gives a notification about a state of drive of cutting tool 5 currently caused by control circuit 11 through light, sound, or vibration. Specifically, notification portion 17 is provided with a light emitting diode (LED), a speaker, or an oscillator as necessary for giving a notification about a state of drive of cutting tool 5, and changes a color of the LED emitting light or changes sound output from the speaker between forward drive and reverse drive. When display portion 16 can show a state of drive of cutting tool 5 to an operator, notification portion 17 does not have to separately include an LED, a speaker, or an oscillator.

Foot controller 18 is an operation button with which drive and control of cutting tool 5 by micromotor 7 is indicated through a stepping operation. Drive and control of cutting tool 5 by micromotor 7 is not limited to drive and control with foot controller 18. An operation switch (not shown) may be provided in grip portion 4 of handpiece 1 and cutting tool 5 may be driven and controlled by using both of the operation switch and foot controller 18. For example, when root canal length measurement circuit 12 detects insertion of cutting tool 5 into a root canal while an operation to step on foot controller 18 is performed, rotation of cutting tool 5 may be started.

Though control box 9 of root canal treatment instrument 100 is used as being placed on a tray table or a side table set at a side portion of a dental treatment couch, the present invention is not limited as such and control box 9 may be incorporated in the tray table or the side table.

Figure 5:
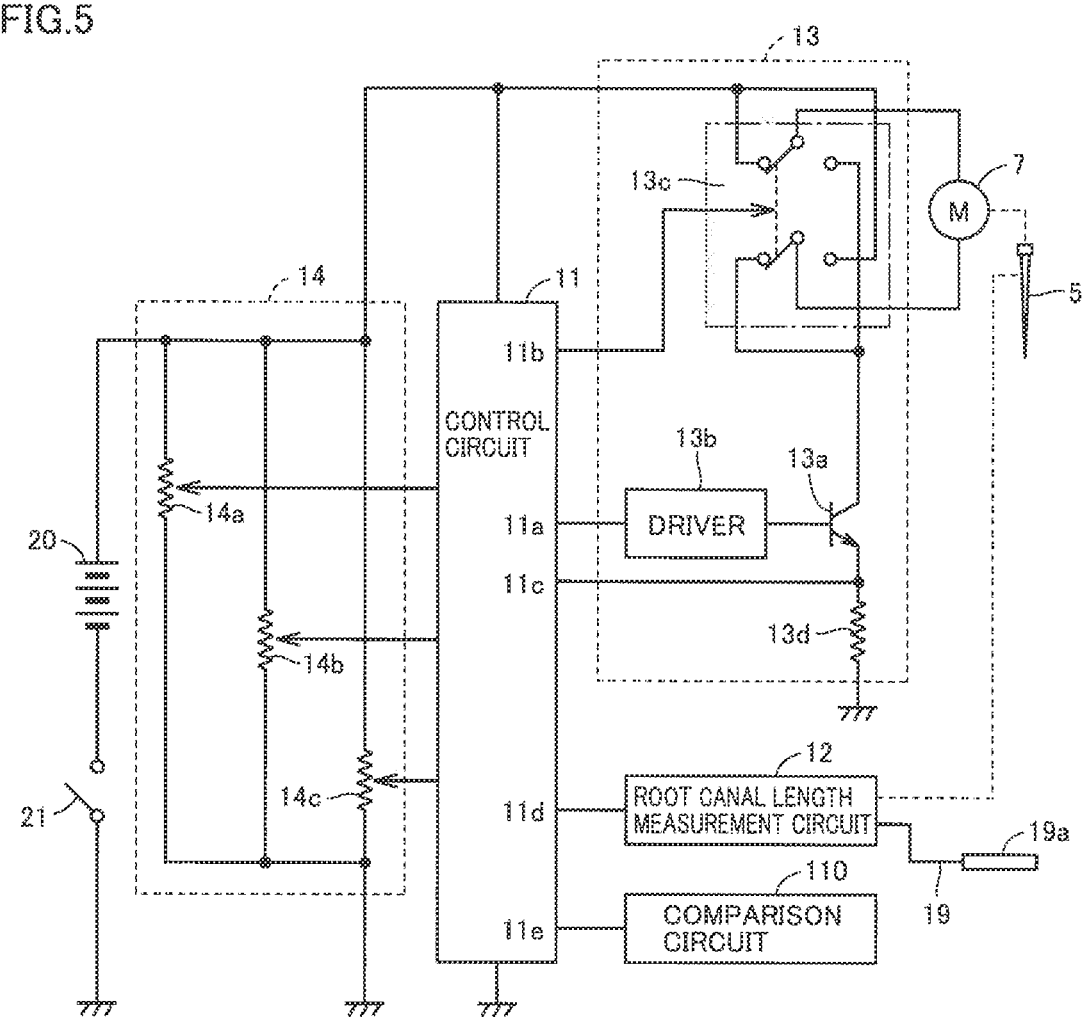
FIG. 5 is a circuit diagram showing a circuit configuration of the root canal treatment instrument according to the first embodiment of the present invention.

A circuit configuration of root canal treatment instrument 100 driving and controlling cutting tool 5 will now be described in further detail. FIG. 5 is a circuit diagram showing a circuit configuration of root canal treatment instrument 100 according to the first embodiment of the present invention. In connection with root canal treatment instrument 100 shown in FIG. 5, micromotor 7 involved with drive and control of cutting tool 5, control circuit 11, comparison circuit 110, root canal length measurement circuit 12, motor driver 13, and setting portion 14 are shown.

Motor driver 13 includes a transistor switch 13a, a transistor driver circuit 13b, a rotation direction switch 13c, and a load detection resistor 13d. Though rotation direction switch 13c is described as a relay element, a motor drive circuit may be configured with a semiconductor switching element such as an FET. Setting portion 14 includes a reference load setting variable resistor 14a, a duty setting variable resistor 14b, and a reference position setting variable resistor 14c. Though setting portion 14 includes also a feature setting an angle of rotation (or a time period for rotation) indicating timing of comparison between a detected load and a reference load by comparison circuit 110, FIG. 5 does not show such a feature. Root canal treatment instrument 100 shown in FIG. 5 is connected to a main power supply 20 and a main switch 21. Cutting tool 5 is held by micromotor 7 with an appropriate gear mechanism being interposed, although it is not shown.

Transistor driver circuit 13b is activated by a control signal output from a port 11a of control circuit 11, controls on and off of transistor switch 13a, and drives micromotor 7. Micromotor 7 rotates clockwise or counterclockwise in accordance with a state of rotation direction switch 13c. When a control signal output from port 11a of control circuit 11 has a waveform of pulses, for example, as being repeated in a certain period, a width of the waveform of the pulses, that is, a duty ratio, is adjusted by duty setting variable resistor 14b of setting portion 14. Micromotor 7 drives cutting tool 5 at the number of rotations corresponding to the duty ratio.

Rotation direction switch 13c switches between drive of cutting tool 5 in the clockwise direction and drive in the counterclockwise direction in accordance with a control signal output from a port 11b of control circuit 11. Control portion 11 detects a load applied to cutting tool 5 based on an amount of a current (or a voltage value) from load detection resistor 13d input to a port 11c. Therefore, load detection resistor 13d functions as a load detector detecting a load applied to cutting tool 5. The load detector is not limited to a feature detecting a load applied to cutting tool 5 based on an amount of a current (or a voltage value) from load detection resistor 13d, but may be implemented by another feature such as a feature detecting a load applied to cutting tool 5 by providing a torque sensor in a portion driving cutting tool 5. A detected load is converted, for example, into a value for torque applied to cutting tool 5 by control circuit 11 and shown on display portion 16. Comparison circuit 110 compares the torque value resulting from conversion by control circuit 11 with a torque value set by reference load setting variable resistor 14a. Comparison circuit 110 may naturally directly compare an amount of a current (or a voltage value) from load detection resistor 13d with an amount of a current (or a voltage value) from variable resistor 14a without conversion into a torque value.

Control portion 11 receives input of a root canal length measured with root canal length measurement circuit 12 at a port 11d. Therefore, root canal length measurement circuit 12 functions as a position detector detecting a position of the tip end of cutting tool 5 in a root canal. Control portion 11 outputs a load applied to cutting tool 5 and detected by the load detector from a port 11e to comparison circuit 110, and receives input of a result of comparison resulting from comparison with the reference load by comparison circuit 110 at port 11e. Therefore, comparison circuit 110 functions as a load comparison portion comparing a load detected by the load detector with the reference load. Control portion 11 may be configured such that the features described as analog circuits may be integrated as software in one micro computer.

Figure 6:
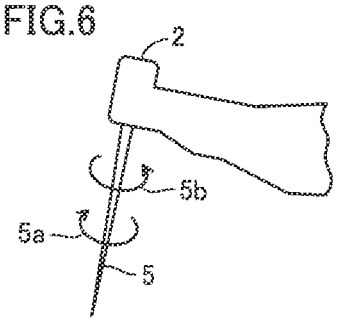
FIG. 6 is a schematic diagram showing a direction of rotation of a cutting tool.

FIG. 6 is a schematic diagram showing a direction of rotation of cutting tool 5. In connection with the direction of rotation of cutting tool 5 shown in FIG. 6, drive in a clockwise direction 5a in which cutting tool 5 is rotated to the right when viewed from the side of cutting tool 5 attached to head 2 toward the tip end of cutting tool 5 and drive in a counterclockwise direction 5b in which the cutting tool is rotated to the left are shown. Such drive that drive for rotating cutting tool 5 clockwise 5a by a predetermined angle of rotation and drive for rotating cutting tool 5 counterclockwise 5b by a predetermined angle of rotation are alternately performed is defined as twist drive.

Figure 7:
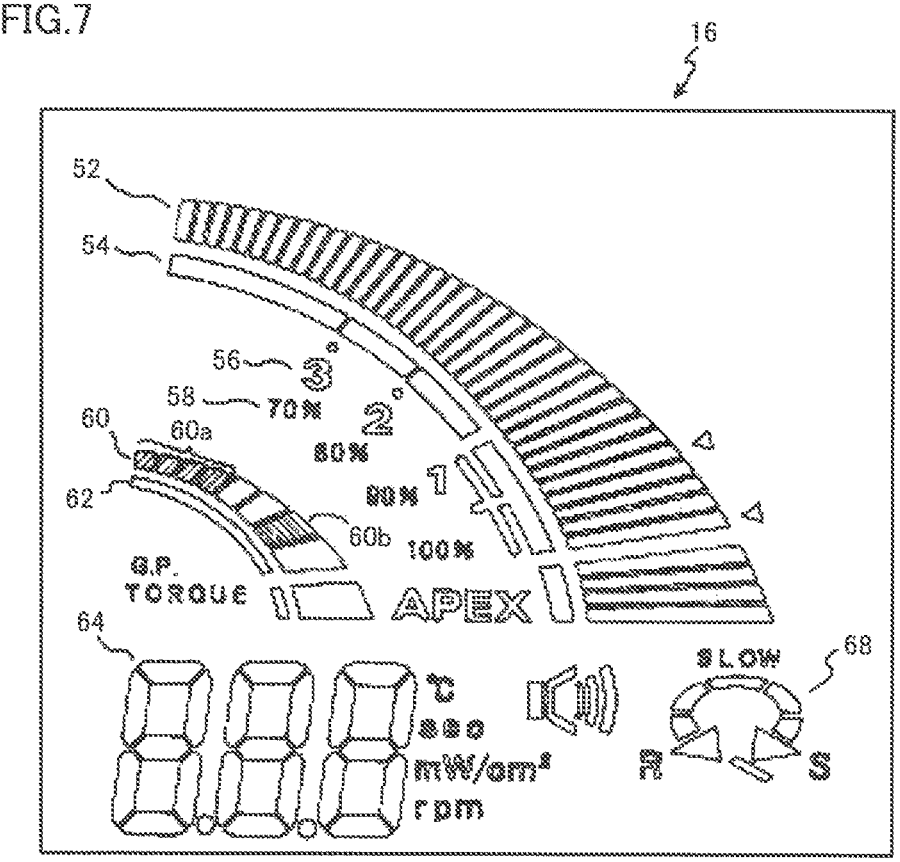
FIG. 7 is a diagram showing an example of representation on a liquid crystal display panel provided in a display portion shown in FIG. 3.

Representation on a liquid crystal display panel provided in display portion 16 shown in FIG. 3 will now be described. FIG. 7 is a diagram showing an example of representation on the liquid crystal display panel provided in display portion 16 shown in FIG. 3.

Display portion 16 shown in FIG. 7 is implemented by a liquid crystal display panel, and includes a dot display portion 52 including a number of elements for showing a measured root canal length in detail, a zone display portion 54 for showing stepwise a root canal length in a plurality of divided zones, a boundary display portion 56 showing a boundary between zones, and a proximity display portion 58 showing proximity to a root apex as a ratio.

Dot display portion 52 shows elements sequentially downward from the top as the tip end of cutting tool 5 is closer to the root apex. A position indicated by a mark "APEX" indicates a position of the root apex, and the element reaching the mark indicates that the tip end of cutting tool 5 has substantially reached the position of the root apex.

Display portion 16 includes a dot display portion 60 including a number of elements for showing a load detected by the load detector (load detection resistor 13d, see FIG. 5) and a zone display portion 62 for showing stepwise a load in a plurality of divided zones. Dot display portion 60 shows elements sequentially downward from the top as a load detected by the load detector is higher.

For example, dot display portion 60 shows with an element 60a shown with hatching, a load on cutting tool 5 applied when a tooth is cut. Dot display portion 60 may have a peak holding function in order to prevent representation from frequently changing and it may show for a certain period of time, a maximum value for the load detected within a prescribed period of time.

Dot display portion 60 may show an element 60b corresponding to the reference load set by setting portion 14 (FIG. 5). By showing element 60b on dot display portion 60, how much margin is left for a load detected by the load detector with respect to the reference load can be visualized.

Display portion 16 further includes a numeric value display portion 64 showing the number of rotations of cutting tool 5 or a load applied to cutting tool 5 with a numeric value and a rotary display portion 68 showing a direction of rotation of cutting tool 5 (clockwise or counterclockwise) and magnitude of the number of rotations of cutting tool 5.

In root canal treatment instrument 100 according to the first embodiment, cutting tool 5 attached to head 2 is driven in accordance with a drive sequence set in advance in control circuit 11. The drive sequence includes a plurality of drive patterns and at least one of the plurality of drive patterns is different from other drive pattern.

Specifically, in root canal treatment instrument 100 according to the first embodiment of the present invention, the cutting tool is driven in accordance with the drive sequence shown in FIG. 2. The drive sequence shown in FIG. 2 includes drive pattern adopted in SET1, in which such drive that cutting tool 5 is rotated by 180 degrees in the cutting direction and cutting tool 5 is further rotated by 90 degrees in the non-cutting direction is repeated four times. The drive sequence shown in FIG. 2 includes drive pattern adopted in SET2, and such drive that cutting tool 5 is rotated by 90 degrees in the cutting direction and cutting tool 5 is further rotated by 180 degrees in the non-cutting direction is repeated four times. Root canal treatment instrument 100 drives cutting tool 5 in accordance with the drive sequence in which the drive pattern adopted in SET1 and a 2-drive pattern adopted in SET2 are sequentially repeated.

Cutting tool 5 making one rotation in each of the cutting direction and the non-cutting direction in a drive sequence is important in ensuring efficiency in cutting. Therefore, instead of repeating a drive pattern four times in drive under SET, such setting that the drive pattern is repeated five times may be made in advance in consideration of a case of failure in rotation by a defined angle of rotation.

The drive sequence shown in FIG. 2 is drive which is combination of the drive pattern adopted in SET1, which is such twist drive that cutting tool 5 is rotated by 180 degrees in the cutting direction and is rotated by 90 degrees in the non-cutting direction, and the drive pattern adopted in SET2 which is drive called the balanced force technique in which cutting tool 5 is rotated by 90 degrees in the cutting direction and by 180 degrees in the non-cutting direction. Therefore, in root canal treatment instrument 100, a period during which drive under the balanced force technique is performed is unexceptionally present in a period of drive in one drive sequence by initially including drive under the balanced force technique conventionally selectively performed by an operator in accordance with a shape or a condition of a root canal as the drive pattern in one drive sequence, so that a root canal of a tooth can appropriately be cut regardless of capability of the operator.

Figure 8:
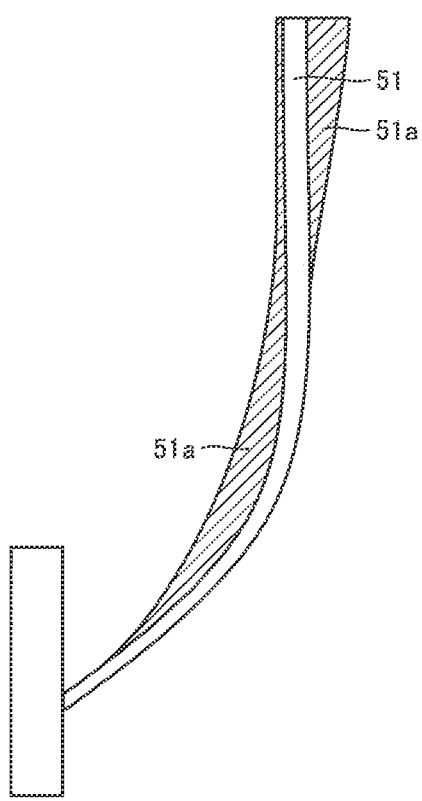
FIG. 8 is a diagram for illustrating linearization of a root canal.

In particular, when a greatly curved root canal is cut, simply by cutting the root canal in twist drive alone or continuous rotation, cutting tool 5 does not follow the curve of the root canal and a portion unnecessary in proper cutting and enlargement may be cut, which may result in linearization of the root canal or occurrence of a recess called a ledge. FIG. 8 is a diagram for illustrating linearization of a root canal. When a root canal 51 shown in FIG. 8 is cut and enlarged, a tooth is cut as far as a hatched portion 51a and curved root canal 51 is linearized. With root canal treatment instrument 100, however, in accordance with the sequence, a period during which drive in the drive pattern adopted in SET2 which is drive under the balanced force technique is performed is provided subsequently to the drive pattern adopted in SET1 representing twist drive. Therefore, cutting and enlargement in conformity with a curved shape of the root canal can be performed and linearization of the root canal or occurrence of the ledge can be suppressed.

In the drive sequence shown in FIG. 2, a period of SET1 is higher in efficiency in cutting than a period of SET2 in which drive under the balanced force technique is performed. Therefore, lowering in efficiency in cutting which is a disadvantage of the balanced force technique can be compensated for. The drive sequence shown in FIG. 2 can achieve both of efficiency in cutting and cutting with a form of a root canal being maintained, which could not be achieved in conventional drive in a single pattern.

Enhanced efficiency in cutting in the drive sequence shown in FIG. 2 can be achieved, for example, by replacing the drive pattern adopted in SET1 with a drive pattern in which cutting tool 5 is rotated only in the cutting direction instead of twist drive (reciprocal drive). Such a drive sequence can achieve enhanced efficiency in cutting because cutting tool 5 is not rotated in the non-cutting direction in the drive pattern adopted in SET1.

As set forth above, the drive sequence controlled by root canal treatment instrument 100 according to the present first embodiment includes a plurality of drive patterns, not only at least one of the plurality of drive patterns is different from another drive pattern but also the plurality of drive patterns should only include at least one drive pattern having drive for rotating cutting tool 5 in the cutting direction (drive in the cutting direction) and drive for rotating cutting tool 5 in the non-cutting direction (drive in the non-cutting direction).

In other words, the drive sequence controlled by root canal treatment instrument 100 according to the present first embodiment includes at least two drive patterns of a first drive pattern and a second drive pattern, the first drive pattern has drive in the cutting direction and drive in the non-cutting direction, and the second drive pattern has at least one of drive in the cutting direction and drive in the non-cutting direction. Therefore, in root canal treatment instrument 100 according to the present first embodiment, one drive sequence includes a plurality of drive patterns so that a period during which drive in conformity with a shape or a condition of a root canal is performed is present in a period of drive in one drive sequence and an operator does not have to consciously select a drive pattern in conformity with a shape or a condition of a root canal. Therefore, root canal treatment instrument 100 according to the present first embodiment can appropriately cut a root canal of a tooth regardless of capability of an operator or a shape or a condition of a root canal.

Second Embodiment

In root canal treatment instrument 100 according to the first embodiment, cutting tool 5 is driven in accordance with a drive sequence including such a drive pattern that drive for rotating cutting tool 5 by 180 degrees in the cutting direction and by 90 degrees in the non-cutting direction is repeated four times and such a drive pattern that drive for rotating cutting tool 5 by 90 degrees in the cutting direction and by 180 degrees in the non-cutting direction is repeated four times. In root canal treatment instrument 100 according to the first embodiment, so long as at least one of the plurality of drive patterns is different from another drive pattern, each drive pattern is not particularly conditioned. For root canal treatment instrument 100 according to the present second embodiment, each drive pattern is newly conditioned. Since root canal treatment instrument 100 according to the present second embodiment is also the same in configuration as root canal treatment instrument 100 according to the first embodiment shown in FIGS. 3 to 5, the same reference numerals are employed and detailed description will not be repeated.

For root canal treatment instrument 100 according to the present second embodiment, at least one of drive patterns included in one drive sequence is limited to a drive pattern unexceptionally including drive in the cutting direction and drive in the non-cutting direction. The drive pattern is conditioned to be limited to three drive patterns in FIGS. 1A to 1C of the basic drive patterns shown in FIGS. 1A to 1E. In root canal treatment instrument 100 according to the present second embodiment, cutting tool 5 is driven based on a drive sequence which is combination of a drive pattern conditioned as such (a first drive pattern) and a drive pattern not conditioned as such (a second drive pattern). For the sake of brevity of description, drive patterns according to the present second embodiment are not distinguished from each other based on whether rotation in the cutting direction precedes or follows rotation in the non-cutting direction. The drive patterns may naturally be distinguished from each other based on whether rotation in the cutting direction precedes or follows rotation in the non-cutting direction.

A drive sequence controlled by root canal treatment instrument 100 according to the present second embodiment will specifically be described below FIGS. 9A to 9D are diagrams for illustrating examples of a drive sequence controlled by root canal treatment instrument 100 according to the second embodiment of the present invention. A solid arrow shown in FIGS. 9A to 9D indicates a direction of rotation of cutting tool 5 and a dashed arrow indicates transition from SET1 to SET2 or from SET2 to SET1. FIGS. 9A to 9D also show a direction of rotation with the direction from the side of cutting tool 5 attached to head 2 toward the tip end of cutting tool 5 being defined as the reference. Therefore, an arrow in the clockwise direction indicates rotation of cutting tool 5 in the cutting direction and an arrow in the counterclockwise direction indicates rotation of cutting tool 5 in the non-cutting direction.

Figure 9A:
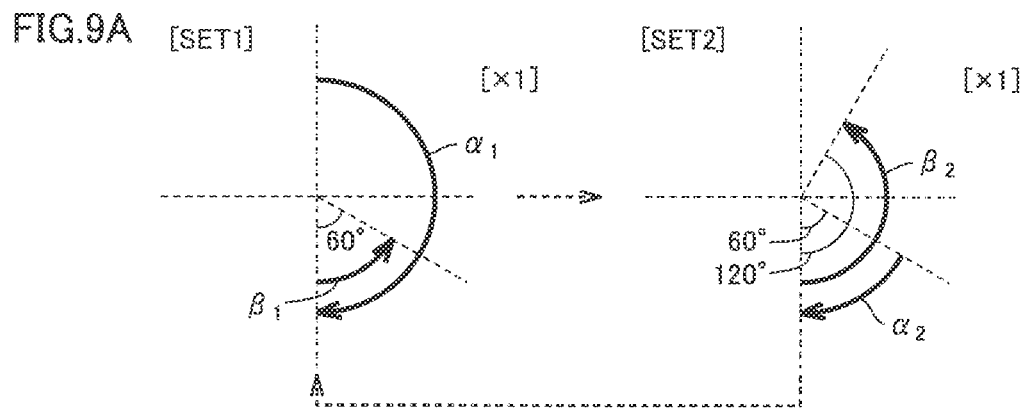
FIGS. 9A to 9D are diagrams for illustrating examples of the drive sequence controlled by the root canal treatment instrument according to a second embodiment of the present invention.

The drive sequence shown in FIG. 9A is combination of SET1 adopting the basic drive pattern shown in FIG. 1A and SET2 adopting the basic drive pattern shown in FIG. 1B, with an angle of rotation in each being varied. Specifically, in the drive pattern adopted in SET, an angle of rotation $\alpha_1$ in the cutting direction is set to 180 degrees, the number of cutting rotations $N_1$ is set to 300 rpm, an angle of rotation $\beta_1$ in the non-cutting direction is set to 60 degrees, the number of non-cutting rotations $N_2$ is set to 300 rpm, and the number of times of repetition is set to 1. In the drive pattern adopted in SET2, an angle of rotation $\alpha_2$ in the cutting direction is set to 60 degrees, the number of cutting rotations $N_3$ is set to 300 rpm, an angle of rotation $\beta_2$ in the non-cutting direction is set to 120 degrees, the number of non-cutting rotations $N_4$ is set to 300 rpm, and the number of times of repetition is set to 1.

In the drive sequence shown in FIG. 9A, a root canal is cut mainly in the drive pattern adopted in SET1. In drive under SET1, the cutting tool is rotated in the non-cutting direction by angle of rotation $\beta_1$=60 degrees, and therefore an effect of removal of bite into an inner wall of the root canal by cutting tool 5 is less. In drive under SET2, the cutting tool is rotated by angle of rotation $\beta_2$=120 degrees in the non-cutting direction so that an effect of removal of bite into the inner wall of the root canal by cutting tool 5 is great and cutting tool 5 can be prevented from breaking. In the drive sequence shown in FIG. 9A, the drive pattern adopted in SET1 and the drive pattern adopted in SET2 are equal to each other in the number of rotations for drive, and such drive that the number of rotations is varied is not carried out.

In the drive sequence shown in FIG. 9A, as a result of drive under SET1, cutting tool 5 is rotated by 120 degrees in the cutting direction, and as a result of drive under SET2, cutting tool 5 is rotated by 60 degrees in the non-cutting direction. Therefore, as a result of drive in one drive sequence, cutting tool 5 can be rotated by 60 degrees in the cutting direction and cutting tool 5 can make one rotation in the cutting direction by repeating the drive sequence six times.

The drive pattern adopted in SET1 is such that a ratio between angle of rotation $\alpha_1$ in drive in the cutting direction=180 degrees and angle of rotation $\beta_1$ in drive in the non-cutting direction=60 degrees is 6:2 which is within a range from 6:1 to 6:5, and the drive pattern adopted in SET2 is such that a ratio between angle of rotation $\alpha_2$ in drive in the cutting direction=60 degrees and angle of rotation $\beta_2$ in drive in the non-cutting direction=120 degrees is 1.5:3 which is within a range from 2:3 to 1:3.

Figure 9B:
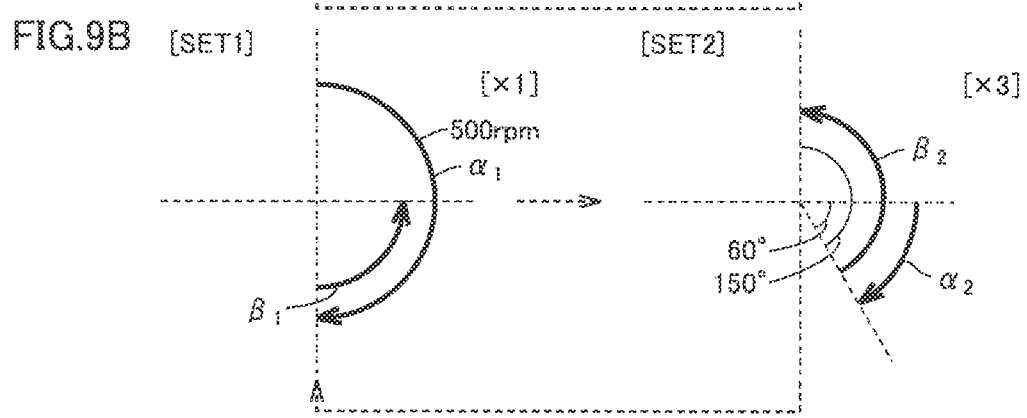

The drive sequence shown in FIG. 9B is also combination of SET1 adopting the basic drive pattern shown in FIG. 1A and SET2 adopting the basic drive pattern shown in FIG. 1B, with an angle of rotation in each being varied. Specifically, in the drive pattern adopted in SET1, 500 rpm and the number of times of repetition=1 are set. In the drive pattern adopted in SET2, angle of rotation $\alpha_2$ in the cutting direction is set to 60 degrees, the number of cutting rotations $N_3$ is set to 300 rpm, angle of rotation $\beta_2$ in the non-cutting direction is set to 150 degrees, the number of non-cutting rotations $N_4$ is set to 300 rpm, and the number of times of repetition is set to 3. In drive under SET2, the drive pattern adopted in SET2 shown in FIG. 9B is consecutively performed three times.

In the drive sequence shown in FIG. 9B, a root canal is cut mainly in the drive pattern adopted in SET1, and bite into the inner wall of the root canal by cutting tool 5 is prevented and removed in the drive pattern adopted in SET2. Since the drive sequence shown in FIG. 9B is greater in the number of times of repetition of the drive pattern adopted in SET2 than the drive sequence shown in FIG. 9A, cutting tool 5 can further be prevented from breaking. In the drive sequence shown in FIG. 9B, the drive pattern adopted in SET2 also functions as drive under the balanced force technique. In the drive sequence shown in FIG. 9B, efficiency in cutting is improved by setting the number of cutting rotations $N_1$ to 500 rpm from 300 rpm.

In the drive sequence shown in FIG. 9B, as a result of drive under SET1, cutting tool 5 is rotated by 90 degrees in the cutting direction, and as a result of drive under SET2, cutting tool 5 is rotated by 90 degrees×3 times=270 degrees in the non-cutting direction. Therefore, as a result of drive in one drive sequence, cutting tool 5 can be rotated by 180 degrees in the non-cutting direction, and cutting tool 5 can make one rotation in the non-cutting direction by repeating the drive sequence twice.

In the drive pattern adopted in SET1, a ratio between angle of rotation $\alpha_1$ in drive in the cutting direction=180 degrees and angle of rotation $\beta_1$ in drive in the non-cutting direction=90 degrees is 6:3 which is within a range from 6:1 to 6:5, and in the drive pattern adopted in SET2, a ratio between angle of rotation $\alpha_2$ in drive in the cutting direction=60 degrees and angle of rotation $\beta_2$ in drive in the non-cutting direction=150 degrees is 1.2:3 which is within a range from 2.3 to 1:3.

Figure 9C:
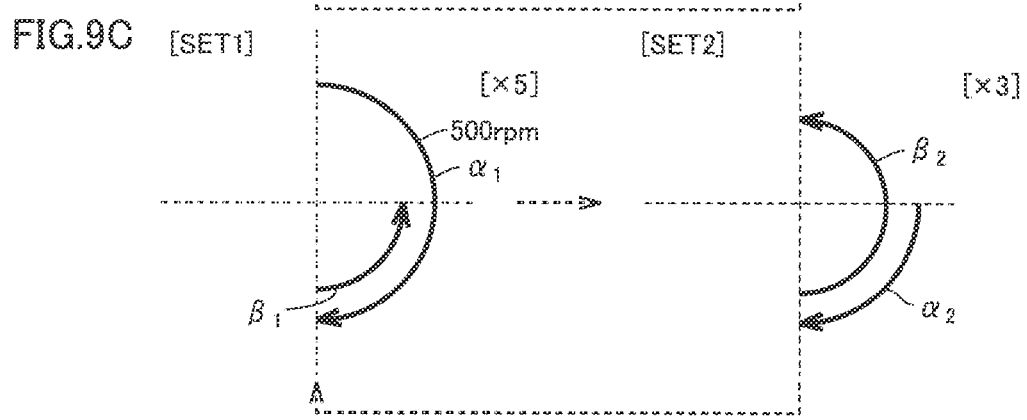

The drive sequence shown in FIG. 9C is also combination of SET1 adopting the basic drive pattern shown in FIG. 1A and SET2 adopting the basic drive pattern shown in FIG. 1B, with an angle of rotation in each being varied. Specifically, in the drive pattern adopted in SET1, angle of rotation $\alpha_1$ in the cutting direction is set to 180 degrees, the number of cutting rotations $N_1$ is set to 500 rpm, angle of rotation $\beta_1$ in the non-cutting direction is set to 90 degrees, the number of non-cutting rotations $N_2$ is set to 300 rpm, and the number of times of repetition is set to 5. In the drive pattern adopted in SET2, angle of rotation $\alpha_2$ in the cutting direction is set to 90 degrees, the number of cutting rotations $N_3$ is set to 300 rpm, angle of rotation $\beta_2$ in the non-cutting direction is set to 180 degrees, the number of non-cutting rotations $N_4$ is set to 300 rpm, and the number of times of repetition is set to 3.

In the drive sequence shown in FIG. 9C, as a result of drive under SET1, cutting tool 5 is rotated in the cutting direction by 90 degrees×5 times=450 degrees and an accumulated difference value representing accumulation of differences between angle of rotation $\alpha_1$ in the cutting direction and angle of rotation $\beta_1$ in the non-cutting direction exceeds one rotation=360 degrees (set value) and hence efficiency in cutting is improved. If cutting tool 5 can make one or more rotations in the cutting direction in one drive under SET1, drive for cutting a root canal (drive in the cutting direction) can sufficiently be ensured and hence efficiency in cutting is improved. In the drive sequence shown in FIG. 9C, as a result of drive under SET2, cutting tool 5 is rotated in the non-cutting direction by 90 degrees×3 times=270 degrees. Therefore, as a result of drive in one drive sequence, cutting tool 5 can be rotated by 180 degrees in the cutting direction, and cutting tool 5 can make one rotation in the cutting direction by repeating the drive sequence twice.

In the drive sequence shown in FIG. 9C as well, a root canal is cut mainly in the drive pattern adopted in SET1, and bite into the inner wall of the root canal by cutting tool 5 is prevented and removed in the drive pattern adopted in SET2. In the drive pattern adopted in SET1, a ratio between angle of rotation $\alpha_1$ in drive in the cutting direction=180 degrees and angle of rotation $\beta_1$ in drive in the non-cutting direction=90 degrees is 6:3 which is within a range from 6:1 to 6.5, and in the drive pattern adopted in SET2, a ratio between angle of rotation $\alpha_2$ in drive in the cutting direction=90 degrees and angle of rotation $\beta_2$ in drive in the non-cutting direction=180 degrees is 1.5:3 which is within a range from 2:3 to 1:3.

Figure 9D:
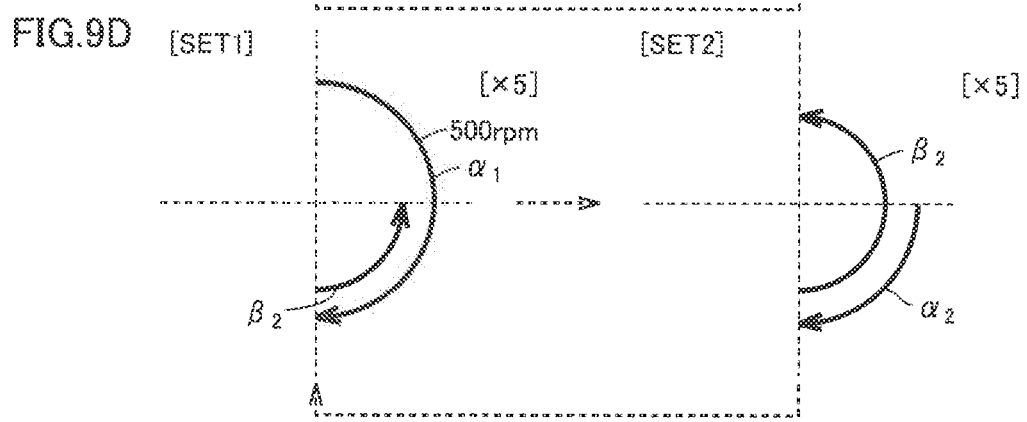

The drive sequence shown in FIG. 9D is also combination of SET1 adopting the basic drive pattern shown in FIG. 1A and SET2 adopting the basic drive pattern shown in FIG. 1B, with an angle of rotation in each being varied. Specifically, in the drive pattern adopted in SET1, angle of rotation $\alpha_1$ in the cutting direction is set to 180 degrees, the number of cutting rotations $N_1$ is set to 500 rpm, angle of rotation $\beta_1$ in the non-cutting direction is set to 90 degrees, the number of non-cutting rotations $N_2$ is set to 300 rpm, and the number of times of repetition is set to 5. In the drive pattern adopted in SET2, angle of rotation $\alpha_2$ in the cutting direction is set to 90 degrees, the number of cutting rotations $N_3$ is set to 300 rpm, angle of rotation $\beta_2$ in the non-cutting direction is set to 180 degrees, the number of non-cutting rotations $N_4$ is set to 300 rpm, and the number of times of repetition is set to 5.

In the drive sequence shown in FIG. 9D, a root canal is cut mainly in the drive pattern adopted in SET1, and bite into the inner wall of the root canal by cutting tool 5 is prevented and removed in the drive pattern adopted in SET2. In the drive sequence shown in FIG. 9D, the drive pattern adopted in SET2 also functions as drive under the balanced force technique. In the drive sequence shown in FIG. 9D, as a result of drive under SET1, cutting tool 5 is rotated in the cutting direction by 90 degrees×5 times=450 degrees and an accumulated difference value representing accumulation of differences between angle of rotation $\alpha_1$ in the cutting direction and angle of rotation $\beta_1$ in the non-cutting direction exceeds one rotation=360 degrees (set value) and hence efficiency in cutting is improved.

In the drive sequence shown in FIG. 9D, as a result of drive under SET2, cutting tool 5 is rotated also in the non-cutting direction by 90 degrees×5 times=450 degrees and an accumulated difference value representing accumulation of differences between angle of rotation $\alpha_2$ in the cutting direction and angle of rotation $\beta_2$ in the non-cutting direction also exceeds one rotation=360 degrees (set value).

Results of drive under SET1 and SET2 both satisfy a condition (a first condition) that an accumulated difference value representing accumulation of differences between the angle of rotation in drive in the cutting direction and the angle of rotation in drive in the non-cutting direction exceeds a set value (360 degrees). The drive pattern adopted in SET1 is a cutting drive pattern in which angle of rotation $\alpha_1$ in drive in the cutting direction is greater than angle of rotation $\beta_1$ in drive in the non-cutting direction, and the drive pattern adopted in SET2 is a non-cutting drive pattern in which angle of rotation $\beta_2$ in drive in the non-cutting direction is greater than angle of rotation $\alpha_2$ in drive in the cutting direction.

When an accumulated difference value representing accumulation of differences between the angle of rotation in drive in the cutting direction and the angle of rotation in drive in the non-cutting direction is 0 (zero) in a drive sequence, drive independent of the cutting direction of cutting tool 5 can be achieved.

Figure 10:
FIG. 10 is a diagram showing a list of drive sequences controlled by the root canal treatment instrument according to the second embodiment of the present invention.

Other examples of the drive sequence adopted in root canal treatment instrument 100 will be described. FIG. 10 is a diagram showing a list of drive sequences controlled by root canal treatment instrument 100 according to the second embodiment of the present invention. FIG. 11 is a diagram showing another list of drive sequences controlled by root canal treatment instrument 100 according to the second embodiment of the present invention. FIG. 12 is a diagram showing yet another list of drive sequences controlled by root canal treatment instrument 100 according to the second embodiment of the present invention. Though FIGS. 10 to 12 show exemplary 18 drive sequences from a drive sequence M1 to a drive sequence M18, the present invention is not limited thereto and other drive sequences may be applicable. In the tables shown in FIGS. 10 to 12, in SET1, an angle of rotation in the cutting direction is denoted as an angle of cutting rotation $\alpha_1$, an angle of rotation in the non-cutting direction is denoted as angle of non-cutting rotation $\beta_1$, the number of rotations in the cutting direction is denoted as the number of cutting rotations $N_1$, and the number of rotations in the non-cutting direction is denoted as the number of non-cutting rotations $N_2$. Similarly, in SET2, an angle of rotation in the cutting direction is denoted as angle of cutting rotation $\alpha_2$, an angle of rotation in the non-cutting direction is denoted as angle of non-cutting rotation $\beta_2$, the number of rotations in the cutting direction is denoted as the number of cutting rotations $N_3$, and the number of rotations in the non-cutting direction is denoted as the number of non-cutting rotations $N_4$. In SET3, an angle of rotation in the cutting direction is denoted as an angle of cutting rotation $\alpha_3$, an angle of rotation in the non-cutting direction is denoted as an angle of non-cutting rotation $\beta_3$, the number of rotations in the cutting direction is denoted as the number of cutting rotations $N_5$, and the number of rotations in the non-cutting direction is denoted as the number of non-cutting rotations $N_6$. In SET4, an angle of rotation in the cutting direction is denoted as an angle of cutting rotation $\alpha_4$, an angle of rotation in the non-cutting direction is denoted as an angle of non-cutting rotation $\beta_4$, the number of rotations in the cutting direction is denoted as the number of cutting rotations $N_7$, and the number of rotations in the non-cutting direction is denoted as the number of non-cutting rotations $N_8$.

Figure 1D:
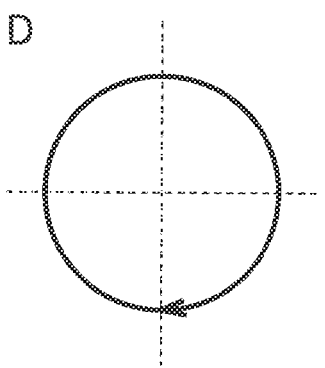
Figure 1E:
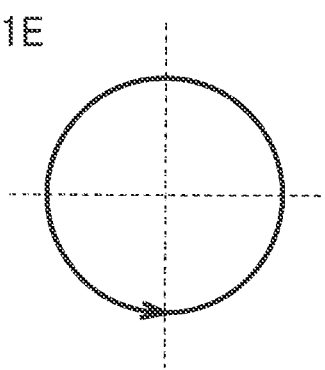

Drive sequence M4 shown in FIG. 10 is combination of the basic drive patterns shown in FIGS. 1A, 1B, and 1E, with an angle of rotation in each being varied. As shown in drive sequence M4 and drive sequence M16 shown in FIG. 12, the number of drive patterns included in a drive sequence is not limited to two but the number of drive patterns should only be two or more.

Specifically, in the drive pattern adopted in SET1 in drive sequence M4, angle of rotation $\alpha_1$ in the cutting direction is set to 180 degrees, the number of cutting rotations $N_1$ is set to 300 rpm, angle of rotation $\beta_3$ in the non-cutting direction is set to 90 degrees, the number of non-cutting rotations $N_2$ is set to 300 rpm, and the number of times of repetition is set to 9. In the drive pattern adopted in SET2, angle of rotation $\alpha_2$ in the cutting direction is set to 90 degrees, the number of cutting rotations $N_3$ is set to 300 rpm, angle of rotation $\beta_2$ in the non-cutting direction is set to 180 degrees, the number of non-cutting rotations $N_4$ is set to 300 rpm, and the number of times of repetition is set to 3. In the drive pattern adopted in SET3, angle of rotation $\alpha_3$ in the cutting direction is set to 0 degree, the number of cutting rotations $N_5$ is set to 0 rpm, angle of rotation $\beta_3$ in the non-cutting direction is set to 360 degrees, the number of non-cutting rotations $N_6$ is set to 300 rpm, and the number of times of repetition is set to 1. In the drive pattern adopted in SET4, angle of rotation $\alpha_4$ in the cutting direction is set to 90 degrees, the number of cutting rotations $N_7$ is set to 300 rpm, angle of rotation $\beta_4$ in the non-cutting direction is set to 180 degrees, the number of non-cutting rotations $N_8$ is set to 300 rpm, and the number of times of repetition is set to 2.

In drive sequence M4, a root canal is cut mainly in the drive pattern adopted in SET1, drive under the balanced force technique is performed in the drive patterns adopted in SET2 and SET4 so as to perform cutting and enlargement in conformity with a shape of the root canal, and bite into the inner wall of the root canal is removed in the drive pattern adopted in SET3. In drive sequence M4, as a result of drive under SET1, cutting tool 5 is rotated by 90 degrees×9 times=810 degrees in the cutting direction, as a result of drive under SET2, cutting tool 5 is rotated by 90 degrees×3 times=270 degrees in the non-cutting direction, as a result of drive under SET3, cutting tool 5 is rotated by 360 degrees in the non-cutting direction, and as a result of drive under SET4, cutting tool 5 is rotated by 90 degrees×2 times=180 degrees in the non-cutting direction.

Drive sequence M9 shown in FIG. 11 is combination of the basic drive pattern shown in FIG. 1A and the basic drive pattern shown in FIG. 1C. Specifically, in the drive pattern adopted in SET1 in drive sequence M9, angle of rotation $\alpha_1$ in the cutting direction is set to 180 degrees, the number of cutting rotations $N_1$ is set to 300 rpm, angle of rotation $\beta_1$ in the non-cutting direction is set to 90 degrees, the number of non-cutting rotations $N_2$ is set to 300 rpm, and the number of times of repetition is set to 1. In the drive pattern adopted in SET2, angle of rotation $\alpha_2$ in the cutting direction is set to 60 degrees, the number of cutting rotations $N_3$ is set to 300 rpm, angle of rotation $\beta_2$ in the non-cutting direction is set to 60 degrees, the number of non-cutting rotations $N_4$ is set to 300 rpm, and the number of times of repetition is set to 5. Drive sequence M9 includes the drive pattern adopted in SET2 which is a symmetric drive pattern in which the angle of rotation in drive in the cutting direction is the same as the angle of rotation in drive in the non-cutting direction and the drive pattern adopted in SET1 which is an asymmetric drive pattern in which the angle of rotation in drive in the cutting direction is different from the angle of rotation in drive in the non-cutting direction. The drive pattern adopted in SET2 which is the symmetric drive pattern is repeated a plurality of times, that is, five times.

In drive sequence M9, a root canal is cut mainly in the drive pattern adopted in SET1, and drive under the watch winding technique is performed in the drive pattern adopted in SET2 so as to achieve drive in consideration of preparatory enlargement of a root canal which tends to be clogged or penetration of a clogged root canal. In drive sequence M9, as a result of drive under SET1, cutting tool 5 is rotated by 90 degrees in the cutting direction, and as a result of drive under SET2, cutting tool 5 is rotated by 0 degree. Therefore, as a result of drive in one drive sequence, cutting tool 5 can be rotated by 90 degrees in the cutting direction, and cutting tool 5 can make one rotation in the cutting direction by repeating the drive sequence four times.

Drive sequence M18 shown in FIG. 12 is combination of the basic drive pattern shown in FIG. 1C and the basic drive pattern shown in FIG. 1D. Specifically, in the drive pattern adopted in SET1 in drive sequence M18, angle of rotation $\alpha_1$ in the cutting direction is set to 90 degrees, the number of cutting rotations $N_1$ is set to 300 rpm, angle of rotation $\beta_1$ in the non-cutting direction is set to 90 degrees, the number of non-cutting rotations $N_2$ is set to 300 rpm, and the number of times of repetition is set to 2 or more. In the drive pattern adopted in SET2, angle of rotation $\alpha_2$ in the cutting direction is set to 45 degrees, the number of cutting rotations $N_3$ is set to 300 rpm, angle of rotation $\beta_2$ in the non-cutting direction is set to 0 degree, the number of non-cutting rotations $N_4$ is set to 0 rpm, and the number of times of repetition is set to 1.

Drive sequence M18 is drive in consideration of twist drive of cutting tool 5 in the drive pattern adopted in SET1 and movement of a position of twist drive in the drive pattern adopted in SET2. Therefore, drive sequence M18 can achieve drive very effective for penetration of a clogged root canal. In drive sequence M18, as a result of drive under SET1, cutting tool 5 is rotated by 0 degree, and as a result of drive under SET2, cutting tool 5 is rotated by 45 degrees in the cutting direction. Therefore, as a result of drive in one drive sequence, cutting tool 5 can be rotated by 45 degrees in the cutting direction and cutting tool 5 can make one rotation in the cutting direction by repeating the drive sequence 8 times.

A drive sequence M19 shown in FIG. 12 is combination of the basic drive pattern shown in FIG. 1C and the basic drive pattern shown in FIG. 1D, similarly to M18. Drive sequence M19 aims at more faithful reproduction of finger motions of an operator in root canal treatment instrument 100. Specifically, in the drive pattern adopted in SET1 in drive sequence M19, angle of rotation $\alpha_1$ in the cutting direction is set to 180 degrees, the number of cutting rotations $N_1$ is set to 100 rpm, angle of rotation $\beta_1$ in the non-cutting direction is set to 180 degrees, the number of non-cutting rotations $N_2$ is set to 100 rpm, and the number of times of repetition is set to 1. In the drive pattern adopted in SET2, angle of rotation $\alpha_2$ in the cutting direction is set to 180 degrees, the number of cutting rotations $N_3$ is set to 100 rpm, angle of rotation $\beta_2$ in the non-cutting direction is set to 270 degrees, the number of non-cutting rotations $N_4$ is set to 100 rpm, and the number of times of repetition is set to 1. Drive under SET1 is similar to motions under the watch winding technique with fingers, and drive under SET2 is similar to motions under the balanced force technique with fingers. The number of rotations is set to 100 rpm equivalent to the speed of rotation with fingers. Therefore, according to drive in M19, the operator can enlarge a root with feeling as felt in his/her fingers.

Drive sequence M19 is drive in consideration of twist drive of cutting tool 5 in the drive pattern adopted in SET1 and movement of a position of twist drive in the drive pattern adopted in SET2 in the non-cutting direction. In drive sequence M19, as a result of drive under SET1, cutting tool 5 is rotated by 0 degree, and as a result of drive under SET2, cutting tool 5 is rotated by 90 degrees in the non-cutting direction. Therefore, as a result of drive in one drive sequence, cutting tool 5 can be rotated by 90 degrees in the non-cutting direction and cutting tool 5 can make one rotation in the non-cutting direction by repeating the drive sequence 4 times.

Processing for drive of cutting tool 5 in accordance with a drive sequence by root canal treatment instrument 100 according to the second embodiment of the present invention will now be described based on a flowchart.

FIG. 13 is a flowchart for illustrating processing for driving cutting tool 5 in accordance with a drive sequence in root canal treatment instrument 100 according to the second embodiment of the present invention. Initially, control circuit 11 reads a drive sequence set in advance and has cutting tool 5 driven in accordance with the drive pattern adopted in SET1 in the read drive sequence (step S131).

For example, when control circuit 11 has cutting tool 5 driven in accordance with drive sequence M1 shown in FIG. 10, it has cutting tool 5 driven in accordance with parameters set as angle of rotation $\alpha_1$ in the cutting direction=180 degrees, the number of cutting rotations $N_1$=300 rpm, angle of rotation $\beta_1$ in the non-cutting direction=90 degrees, and the number of non-cutting rotations $N_2$=300 rpm in the drive pattern adopted in SET1. Control portion 11 may allow an operator to select a drive sequence to be executed from among a plurality of drive sequences through operation button 15.

Control portion 11 may include a memory (for example, a ROM or a flash memory) storing a plurality of drive sequences (the drive sequences shown in FIGS. 10 to 12) and operation button 15 serving as a selection portion allowing selection of a drive sequence used for control of the drive motor among the plurality of drive sequences stored in the memory. Alternatively, control circuit 11 may allow an operator to input a parameter of the drive pattern included in the drive sequence to be executed (such as an angle of rotation, an angular rotation speed, and the number of times of repetition) through operation button 15. Operation portion 15 for inputting a parameter predetermined in each drive pattern may be able to accept an input of a parameter from an operator.

Then, control circuit 11 determines whether or not the number of times of repetition set in the drive pattern adopted in SET1 has been reached (step S132). For example, in drive sequence M1 shown in FIG. 10, the number of times of repetition of the drive pattern adopted in SET1 is set to 5 and hence control circuit 11 determines whether or not the number of times of repetition of the drive pattern adopted in SET1 has reached 5. When it is determined that the number of times of repetition has been reached (step S132: YES), control circuit 11 has cutting tool 5 driven in accordance with the drive pattern adopted in SET2 in the read drive sequence (step S133). For example, when control circuit 11 has cutting tool 5 driven in accordance with drive sequence M1 shown in FIG. 10, it has cutting tool 5 driven in accordance with parameters set as angle of rotation $\alpha_2$ in the cutting direction=90 degrees, the number of cutting rotations $N_3$=300 rpm, angle of rotation $\beta_2$ in the non-cutting direction=180 degrees, and the number of non-cutting rotations $N_4$=300 rpm in the drive pattern adopted in SET2. When it is determined that the number of times of repetition has not been reached (step S132: NO), control circuit 11 returns the process to step S131.

Then, control circuit 11 determines whether or not the number of times of repetition set in the drive pattern adopted in SET2 has been reached (step S134). For example, in drive sequence M1 shown in FIG. 10, the number of times of repetition of the drive pattern adopted in SET2 is also set to 5 and therefore control circuit 11 determines whether or not the number of times of repetition of the drive pattern adopted in SET2 has reached 5. When it is determined that the number of times of repetition has been reached (step S134: YES), control circuit 11 determines whether or not the read drive sequence includes another drive pattern (step S135). When it is determined that the number of times of repetition has not been reached (step S134: NO), control circuit 11 returns the process to step S133.

Then, when the read drive sequence includes another drive pattern (for example, the drive pattern adopted in SET3 or SET4) (step S135: YES), control circuit 11 has cutting tool 5 driven in accordance with another drive pattern in the read drive sequence (step S136). Control portion 11 has cutting tool 5 driven in accordance with another drive pattern the set number of times of repetition and thereafter returns the process to step S135. Control portion 11 successively reads a drive pattern adopted in SET included in the read drive sequence and has cutting tool 5 driven. For example, though drive sequence M1 shown in FIG. 10 does not include a drive pattern following SET2, drive sequence M4 includes the drive patterns adopted in SET3 and SET4 and hence control circuit 11 successively reads the drive patterns adopted in SET3 and SET4 and has cutting tool 5 driven.

When the read drive sequence does not include another drive pattern (step S135: NO), control circuit 11 determines whether or not an operation to quit drive has been provided through operation button 15 (step S137). When an operation to quit drive has been input through operation button 15 (step S137: YES), control circuit 11 quits drive. When an operation to quit drive has not been provided through operation button 15 (step S237: NO), control circuit 11 returns to the processing in step S131 and drives cutting tool 5 in accordance with the drive pattern adopted in SET1 in the read drive sequence (step S131).

As set forth above, in the method of driving root canal treatment instrument 100 according to the present second embodiment, control circuit 11 has cutting tool 5 driven in accordance with the drive sequence, the drive sequence includes a plurality of drive patterns, and at least one drive pattern is different from other drive pattern and includes at least one drive pattern having drive for rotating cutting tool 5 in the cutting direction and drive for rotating cutting tool 5 in the non-cutting direction. Therefore, in the method of driving root canal treatment instrument 100 according to the present second embodiment, one drive sequence includes a plurality of drive patterns so that a period during which drive in conformity with a shape or a condition of a root canal is performed can be provided in a period of drive in one drive sequence and an operator does not have to consciously select a drive pattern. Therefore, the method of driving root canal treatment instrument 100 according to the present second embodiment can appropriately cut a root canal of a tooth regardless of capability of an operator or a shape or a condition of the root canal.

Though the drive sequences shown in FIGS. 10 to 12 have been described on the premise that control circuit 11 has the cutting tool driven successively in the drive pattern adopted in SET1 and the drive pattern adopted in SET2, limitation thereto is not intended. For example, a stop operation may be set between the drive patterns. Specifically, in drive sequence M1, after the drive pattern adopted in SET1 is repeated 5 times, a stop operation (for example, 500 milliseconds) may be set and thereafter the drive pattern adopted in SET2 may be repeated 5 times. A stop operation may further be set also between drive in the cutting direction and drive in the non-cutting direction in a drive pattern. For example, in the drive pattern adopted in SET1 in drive sequence M1, a stop operation (for example, 50 milliseconds) may be set after rotation of cutting tool 5 with angle of rotation $\alpha_1$ in the cutting direction=180 degrees being set, and thereafter cutting tool 5 may be rotated with angle of rotation $\beta_1$ in the non-cutting direction=90 degrees being set. Presence or absence of a stop operation between drives may also be predetermined in each drive pattern as one parameter.

Third Embodiment

Combination of control for driving cutting tool 5 in accordance with the drive sequence described in the first embodiment of the present invention with control based on a load applied to cutting tool 5 will be described. Since the root canal treatment instrument according to the third embodiment is the same in configuration as root canal treatment instrument 100 according to the first embodiment shown in FIGS. 3 to 5, the same reference numerals are employed and detailed description will not be repeated.

Figure 14:
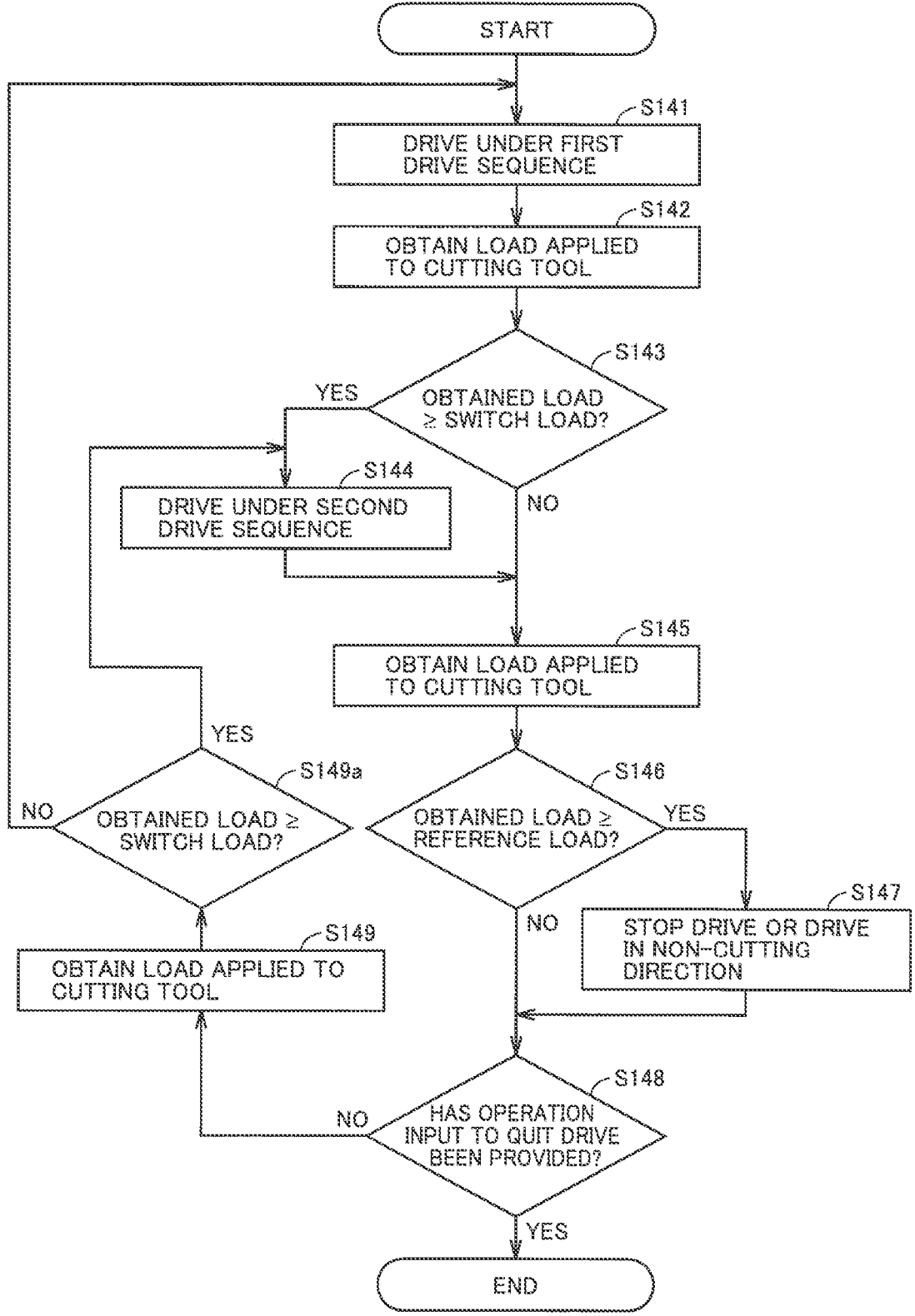
FIG. 14 is a flowchart for illustrating control based on a load applied to the cutting tool in the root canal treatment instrument according to a third embodiment of the present invention.

FIG. 14 is a flowchart for illustrating control based on a load applied to cutting tool 5 in root canal treatment instrument 100 according to a third embodiment of the present invention. Initially, control circuit 11 reads a first drive sequence set in advance and has cutting tool 5 driven sequentially from the drive pattern adopted in SET1 in the read first drive sequence (step S141). For example, control circuit 11 has drive sequence M2 shown in FIG. 10 set in advance as the first drive sequence and has cutting tool 5 driven in accordance with the drive patterns adopted in SET1 and SET2 in drive sequence M2. Specifically, as a result of drive under SET1 in drive sequence M2, control circuit 11 has cutting tool 5 rotate by 180 degrees×9 times=1620 degrees in the cutting direction, and therefore it has cutting tool 5 driven mainly for the purpose of cutting of a root canal.

Then, control circuit 11 obtains a load applied to cutting tool 5 and detected by the load detector (step S142). Specifically, control circuit 11 detects with the load detector, a load applied at the time when cutting tool 5 is driven to rotate in the cutting direction and obtains the detected load. Then, comparison circuit 110 compares the obtained load with a switch load set by setting portion 14 (step S143). Thus, application of a load more than necessary onto cutting tool 5 as a result of drive in the first drive sequence can be detected and the drive sequence is switched in order to lower the load. The switch load is set to a value smaller than the reference load.

When it is determined that the obtained load is equal to or higher than the switch load (step S143: YES), control circuit 11 reads the second drive sequence and has cutting tool 5 driven successively from the drive pattern adopted in SET1 in the read second drive sequence (step S144). For example, when a load equal to or higher than the switch load is applied to cutting tool 5, control circuit 11 switches the sequence to the second drive sequence which is drive sequence M3 shown in FIG. 10 and has cutting tool 5 driven in accordance with the drive patterns adopted in SET1 and SET2 in drive sequence M3. Specifically, as a result of drive under SET2 in drive sequence M3, control circuit 11 has cutting tool 5 driven so as to rotate cutting tool 5 by 360 degrees in the non-cutting direction and to remove bite into a wall of the root canal and lower the load applied to cutting tool 5.

In the processing in step S144, an example in which the drive sequence itself is switched from the first drive sequence to the second drive sequence is shown, however, limitation thereto is not intended. For example, when a load equal to or higher than the switch load is applied to cutting tool 5, control circuit 11 may change parameters such as an angle of rotation, an angular rotation speed, and the number of times of repetition of the drive pattern adopted in the first drive sequence, without switching the drive sequence itself.

When it is determined that the obtained load is lower than the switch load (step S143: NO) or when cutting tool 5 is driven in accordance with the second drive sequence (step S144), control circuit 11 further obtains a load applied to cutting tool 5 and detected by the load detector (step S145). Then, comparison circuit 110 compares the obtained load with the reference load set by setting portion 14 (step S146). When it is determined that the obtained load is equal to or higher than the reference load (step S146: YES), control circuit 11 stops drive of cutting tool 5 or has cutting tool 5 rotate in the non-cutting direction rotation (step S147). When a load applied to cutting tool 5 cannot be lowered and a load applied to cutting tool 5 exceeds the reference load in spite of switching of the sequence to the second drive sequence or when the reference load is exceeded even when cutting tool 5 is driven in accordance with the first drive sequence, control circuit 11 stops drive of cutting tool 5. When control circuit 11 determines that the obtained load is equal to or higher than the reference load, it may change a parameter such as an angle of rotation, an angular rotation speed, and the number of times of repetition of the drive pattern.

When it is determined that the obtained load is lower than the reference load (step S146: NO) or when drive of cutting tool 5 has been stopped (step S147), control circuit 11 determines whether or not an operation to quit drive has been provided through operation button 15 (step S148). When an operation to quit drive has been provided through operation button 15 (step S148: YES), control circuit 11 quits drive. When an operation to quit drive has not been provided through operation button 15 (step S148: NO), control circuit 11 proceeds to processing in step S149.

Then, control circuit 11 obtains a load applied to cutting tool 5 and detected by the load detector (step S149). When it is determined that the obtained load is equal to or higher than the switch load (step S149a: YES), control circuit 11 returns to the processing in step S144 with drive in the second drive sequence being maintained. When it is determined that the obtained load is lower than the switch load (step S149a: NO), the process returns to step S141 in order to switch to drive in the first drive sequence.

As set forth above, control circuit 11 selects a drive sequence or changes a parameter of a drive pattern included in the drive sequence in accordance with a load applied to cutting tool 5 and detected by the load detector. Specifically, when a load applied to cutting tool 5 is lower than a switch criterion, control circuit 11 has cutting tool 5 driven in accordance with the first drive sequence, and when a load applied to cutting tool 5 is equal to or higher than the switch criterion, it has cutting tool 5 driven in accordance with the second drive sequence or the first drive sequence with its parameter in the drive pattern being changed. Therefore, root canal treatment instrument 100 according to the present third embodiment can drive cutting tool 5 in accordance with a drive pattern in accordance with a load applied to cutting tool 5 and can lower the load applied to cutting tool 5. When control circuit 11 determines that the obtained load is equal to or higher than the reference load, it controls drive to drive for rotating cutting tool 5 in the non-cutting direction rotation (drive in the non-cutting direction) or drive for stopping rotation of cutting tool 5, and hence the cutting tool can be prevented from breaking due to the applied load.

Fourth Embodiment

Combination of control for driving cutting tool 5 in accordance with the drive sequence described in the first embodiment of the present invention with control based on a position of cutting tool 5 obtained from root canal length measurement circuit 12 (a position in a root canal of the tip end of cutting tool 5 obtained with root canal length measurement circuit 12) will be described. Since root canal treatment instrument 100 according to the present fourth embodiment is the same in configuration as root canal treatment instrument 100 according to the first embodiment shown in FIGS. 3 to 5, the same reference numerals are employed and detailed description will not be repeated.

Initially, as control in accordance with a position of cutting tool 5, when a position of cutting tool 5 is close to a root apex (reaches a switch position), control circuit 11 carries out control for switching a drive sequence. Specifically, when a position of cutting tool 5 is close to a root apex, control circuit 11 switches a sequence to twist drive as in drive sequence M17 shown in FIG. 12. Control portion 11 may switch to a drive sequence consisting of SET1 in drive sequence M17 (pure twist drive).

Figure 15:
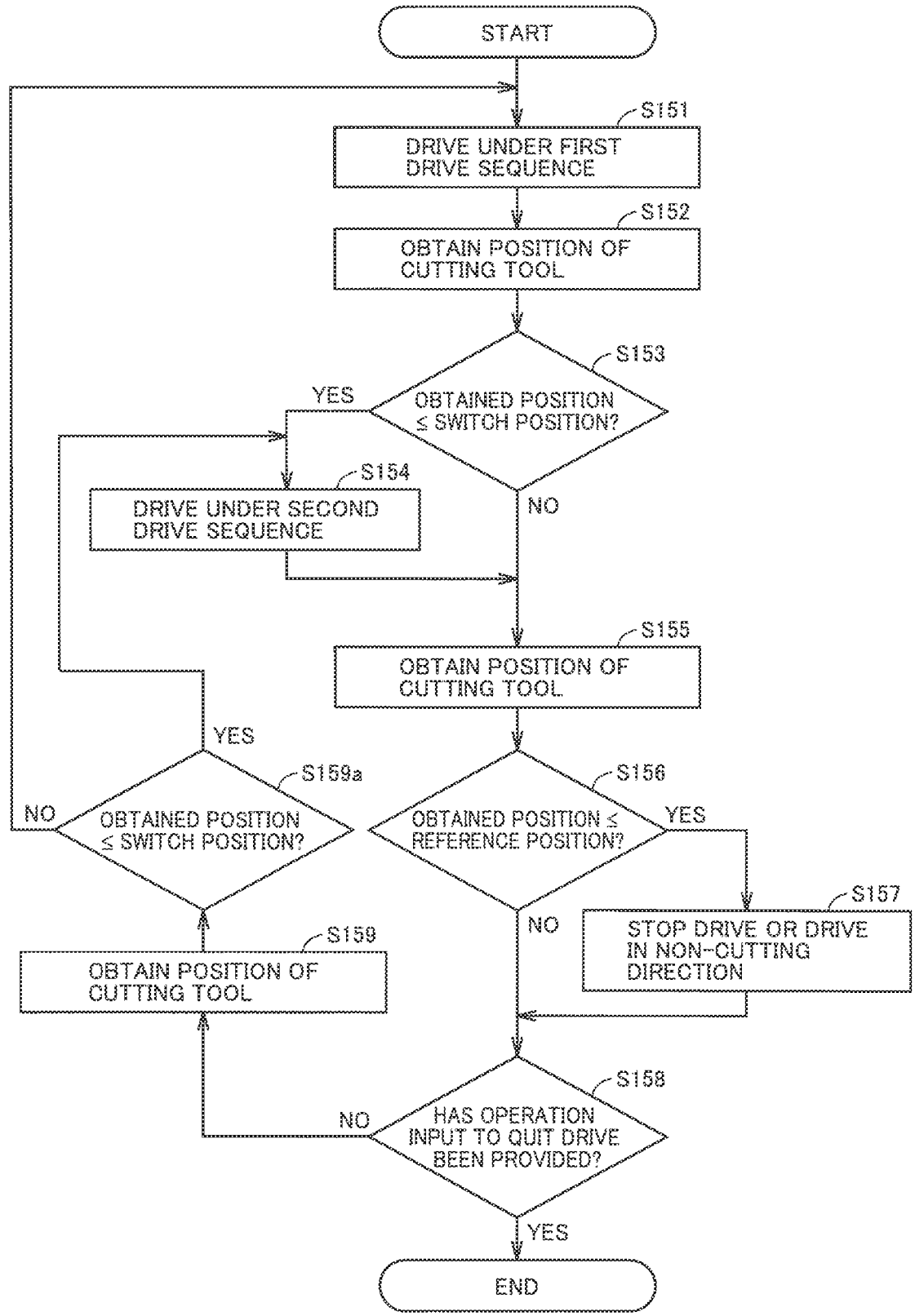
FIG. 15 is a flowchart for illustrating control in accordance with a position of the cutting tool in the root canal treatment instrument according to a fourth embodiment of the present invention.

FIG. 15 is a flowchart for illustrating control based on a position of cutting tool 5 in root canal treatment instrument 100 according to a fourth embodiment of the present invention. Initially, control circuit 11 reads a first drive sequence set in advance and has cutting tool 5 driven sequentially from the drive pattern adopted in SET1 in the read first drive sequence (step S151). For example, control circuit 11 has drive sequence M5 shown in FIG. 10 set in advance as the first drive sequence and has cutting tool 5 driven in accordance with the drive patterns adopted in SET1 and SET2 in drive sequence M5. Specifically, as a result of drive under SET1, control circuit 11 has cutting tool 5 rotate by 360 degrees×3 times=1080 degrees in the cutting direction, and therefore it has cutting tool 5 driven mainly for the purpose of cutting of a root canal.

Then, control circuit 11 obtains a position of cutting tool 5 with root canal length measurement circuit 12 (step S152). Control portion 11 determines whether or not a position of cutting tool 5 obtained from root canal length measurement circuit 12 has reached a switch position (a position of the cutting tool≤ the switch position) (step S153). When it is determined that the obtained position of cutting tool 5 has reached the switch position (step S153: YES), control circuit 11 reads a second drive sequence and has cutting tool 5 driven sequentially from the drive pattern adopted in SET1 in the read second drive sequence (step S154). For example, when a position of cutting tool 5 is close to the root apex, control circuit 11 switches the sequence to the second sequence which is drive sequence M17 including twist drive small in angle of rotation (specifically, angle of rotation $\beta_1$ in the cutting direction=90 degrees and angle of rotation $\beta_1$ in the non-cutting direction=90 degrees) and has cutting tool 5 driven in accordance with the drive patterns adopted in SET1 and SET2 in drive sequence M17.

Though switching of the drive sequence itself from the first drive sequence to the second drive sequence in the processing in step S154 has been shown, limitation thereto is not intended. For example, when control circuit 11 determines that the switch position has been reached, control circuit 11 may change a parameter such as an angle of rotation, an angular rotation speed, and the number of times of repetition of the drive pattern adopted in the first drive sequence, without switching the drive sequence itself.

When it is determined that the obtained position of cutting tool 5 has not reached the switch position (step S153: NO) or when cutting tool 5 is driven in accordance with the second drive sequence (step S154), control circuit 11 further obtains a position of cutting tool 5 with root canal length measurement circuit 12 (step S155). Then, control circuit 11 determines whether or not the position of cutting tool 5 obtained from root canal length measurement circuit 12 has reached the reference position (a position of the cutting tool≤ the reference position) (step S156). When it is determined that the obtained position of cutting tool 5 has reached the reference position (step S156: YES), control circuit 11 stops drive of cutting tool 5 or has cutting tool 5 rotate in the non-cutting direction rotation (step S157). When control circuit 11 determines that the obtained position of cutting tool 5 has reached the reference position, it may change a parameter such as an angle of rotation, an angular rotation speed, and the number of times of repetition of the drive pattern.

When it is determined that the obtained position of cutting tool 5 has not reached the reference position (step S156: NO) or when drive of cutting tool 5 has been stopped (step S157), control circuit 11 determines whether or not an operation to quit drive has been provided through operation button 15 (step S158). When an operation to quit drive has been provided through operation button 15 (step S158: YES), control circuit 11 quits drive. When an operation to quit drive has not been provided through operation button 15 (step S158: NO), control circuit 11 proceeds to processing in step S159.

Then, control circuit 11 obtains a position of cutting tool 5 with root canal length measurement circuit 12 (step S159). When it is determined that the position of cutting tool 5 obtained from root canal length measurement circuit 12 has reached the switch position (step S159a: YES), control circuit 11 returns the process to step S154 with drive in the second drive sequence being maintained. When it is determined that the obtained position of cutting tool 5 has not reached the switch position (step S159a: NO), the process returns to step S151 in order to switch to drive in the first drive sequence.

As set forth above, control circuit 11 selects a drive sequence or changes a parameter of a drive pattern included in the drive sequence in accordance with a position of cutting tool 5 detected by root canal length measurement circuit 12. Specifically, when a position of cutting tool 5 has not reached the switch position, control circuit 11 has cutting tool 5 driven in accordance with the first drive sequence, and when a position of cutting tool 5 has reached the switch position, it has cutting tool 5 driven in accordance with the second drive sequence or the first drive sequence with its parameter in the drive pattern being changed. Therefore, root canal treatment instrument 100 according to the present fourth embodiment can drive cutting tool 5 in accordance with a drive pattern in accordance with a position of cutting tool 5, and can perform cutting in accordance with the position of cutting tool 5. When control circuit 11 determines that the position of cutting tool 5 detected by root canal length measurement circuit 12 has reached the reference position, it controls drive to drive for rotating cutting tool 5 in the non-cutting direction rotation (drive in the non-cutting direction) or drive for stopping rotation of cutting tool 5, and hence an operation in the vicinity of the reference position (a position of a root apex) can safely be performed.

(Modification)

Figure 16:
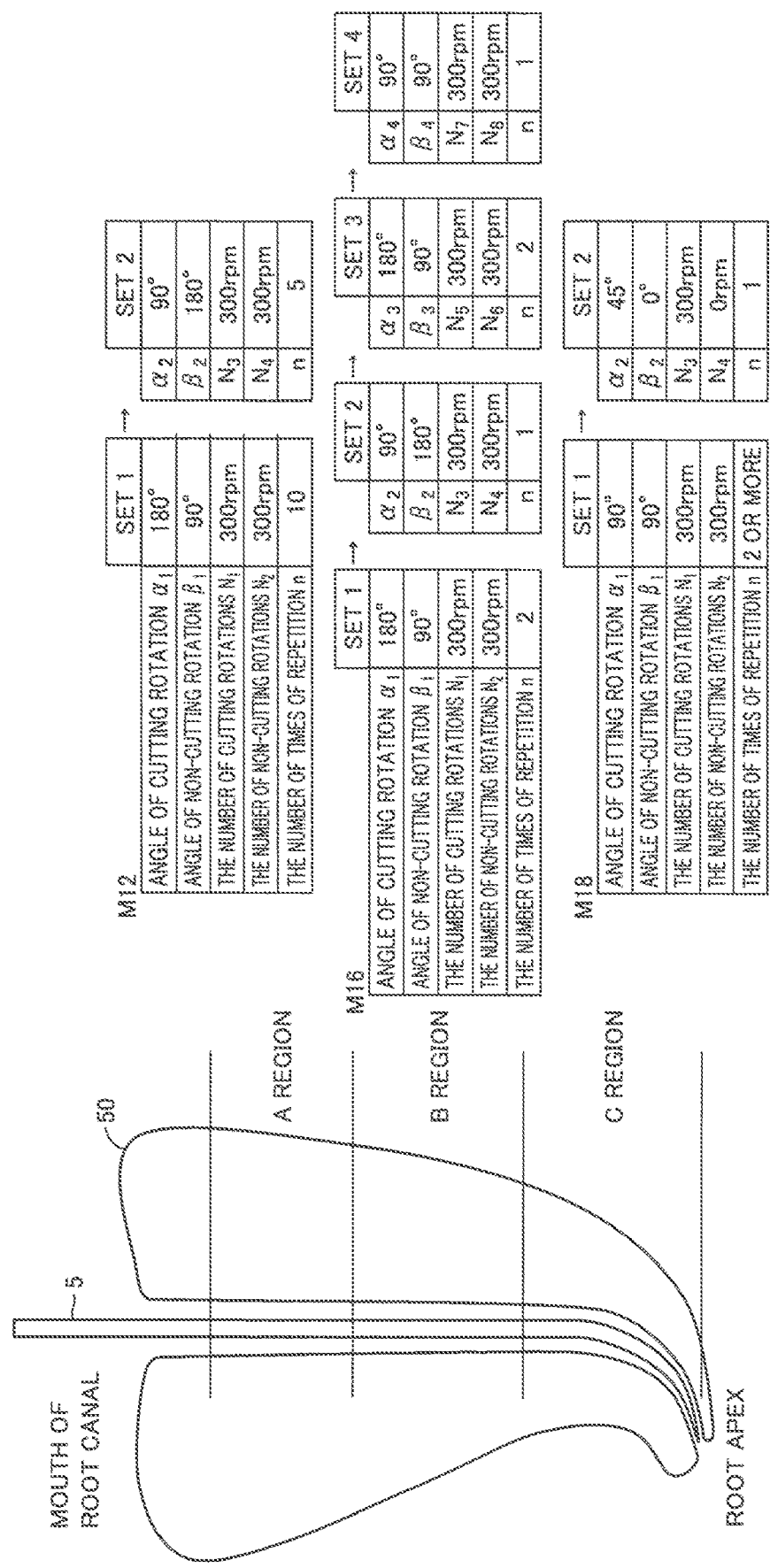
FIG. 16 is a conceptual diagram for illustrating control in accordance with a region of a root canal in the root canal treatment instrument according to a modification of the fourth embodiment of the present invention.

Control of root canal treatment instrument 100 according to the present fourth embodiment described previously for switching a drive sequence or changing a parameter of a drive pattern included in the drive sequence depending on whether or not a switch position has been reached has been described. The present invention, however, is not limited as such, and root canal treatment instrument 100 according to a modification of the present fourth embodiment may carry out control for switching a drive sequence or changing a parameter of a drive pattern included in the drive sequence in accordance with a region resulting from division of a root canal of a tooth into a plurality of regions. FIG. 16 is a conceptual diagram for illustrating control in accordance with a region of a root canal in root canal treatment instrument 100 according to a modification of the fourth embodiment of the present invention. In a tooth 50 shown in FIG. 16, a root canal from a mouth of the root canal to the root apex is divided into three regions of an A region, a B region, and a C region.

Initially, when the tip end of cutting tool 5 is within the A region, control circuit SI has cutting tool 5 driven in accordance with drive sequence M12 shown in FIG. 11. Specifically, drive sequence M12 includes the drive pattern adopted in SET1 and the drive pattern adopted in SET2. In the drive pattern adopted in SET1, cutting tool 5 is driven with angle of rotation $\alpha_1$ in the cutting direction being set to 180 degrees, the number of cutting rotations $N_1$ being set to 300 rpm, angle of rotation $\beta_1$ in the non-cutting direction being set to 90 degrees, the number of non-cutting rotations $N_2$ being set to 300 rpm, and the number of times of repetition being set to 10. In the drive pattern adopted in SET2, cutting tool 5 is driven with angle of rotation $\alpha_2$ in the cutting direction being set to 90 degrees, the number of cutting rotations $N_3$ being set to 300 rpm, angle of rotation $\beta_2$ in the non-cutting direction being set to 180 degrees, the number of non-cutting rotations $N_4$ being set to 300 rpm, and the number of times of repetition being set to 5. In drive sequence M12, as a result of drive under SET1, cutting tool 5 is rotated by 180 degrees×10 times=1800 degrees in the cutting direction and cutting tool 5 is driven mainly for the purpose of cutting of a root canal. In the A region close to the mouth of the root canal, the root canal is large in diameter and curved to a lesser extent. Therefore, control circuit 11 has cutting tool 5 driven in accordance with drive sequence M12 high in efficiency in cutting.

Then, when the tip end of cutting tool 5 is within the B region, control circuit 11 has cutting tool 5 driven in accordance with drive sequence M16 shown in FIG. 12. Specifically, drive sequence M16 includes four patterns of the drive pattern adopted in SET1 to the drive pattern adopted in SET4. In the drive pattern adopted in SET1, cutting tool 5 is driven with angle of rotation $\alpha_1$ in the cutting direction being set to 180 degrees, the number of cutting rotations $N_1$ being set to 300 rpm, angle of rotation $\beta_1$ in the non-cutting direction being set to 90 degrees, the number of non-cutting rotations $N_2$ being set to 300 rpm, and the number of times of repetition being set to 2 In the drive pattern adopted in SET2, cutting tool 5 is driven with angle of rotation $\alpha_2$ in the cutting direction being set to 90 degrees, the number of cutting rotations $N_3$ being set to 300 rpm, angle of rotation $\beta_2$ in the non-cutting direction being set to 180 degrees, the number of non-cutting rotations $N_4$ being set to 300 rpm, and the number of times of repetition being set to 1. In the drive pattern adopted in SET3, cutting tool 5 is driven with angle of rotation $\alpha_3$ in the cutting direction being set to 180 degrees, the number of cutting rotations $N_5$ being set to 300 rpm, angle of rotation $\beta_3$ in the non-cutting direction being set to 90 degrees, the number of non-cutting rotations $N_6$ being set to 300 rpm, and the number of times of repetition being set to 2. In the drive pattern adopted in SET4, cutting tool 5 is driven with angle of rotation $\alpha_4$ in the cutting direction being set to 90 degrees, the number of cutting rotations $N_7$ being set to 300 rpm, angle of rotation $\beta_4$ in the non-cutting direction being set to 90 degrees, the number of non-cutting rotations $N_8$ being set to 300 rpm, and the number of times of repetition being set to 1. In drive sequence M16, in the drive pattern adopted in SET2, drive under the balanced force technique is performed so as to perform cutting and enlargement in conformity with a shape of the root canal. In the drive pattern adopted in SET4, cutting tool 5 is driven with drive under the watch winding technique. In the B region, the root canal gradually becomes smaller in diameter and starts to curve. The B region, however, is still distant from the position of the root apex, and hence control circuit 11 has cutting tool 5 driven in accordance with drive sequence M16 in conformity with a shape of the root canal in consideration of efficiency in cutting.

Then, when the tip end of cutting tool 5 is within the C region, control circuit 11 has cutting tool 5 driven in accordance with drive sequence M18 shown in FIG. 12. Specifically, drive sequence M18 includes the drive pattern adopted in SET1 and the drive pattern adopted in SET2. In the drive pattern adopted in SET1, cutting tool 5 is driven with angle of rotation $\alpha_1$ in the cutting direction being set to 90 degrees, the number of cutting rotations $N_1$ being set to 300 rpm, angle of rotation $\beta_1$ in the non-cutting direction being set to 90 degrees, the number of non-cutting rotations $N_2$ being set to 300 rpm, and the number of times of repetition being set to 2 or more. In the drive pattern adopted in SET2, cutting tool 5 is driven with angle of rotation $\alpha_2$ in the cutting direction being set to 45 degrees, the number of cutting rotations $N_3$ being set to 300 rpm, angle of rotation $\beta_2$ in the non-cutting direction being set to 0 degree, the number of non-cutting rotations $N_4$ being set to 0 rpm, and the number of times of repetition being set to 1. In drive sequence M18, cutting tool 5 is driven in twist drive at an angle of rotation in the cutting direction smaller than in other regions (for example, 90 degrees). In the C region close to the root apex, the root canal is small in diameter and greatly curved. Therefore, control circuit 11 has cutting tool 5 driven in accordance with drive sequence M18 in which a load onto cutting tool 5 is lower, rather than importance being placed on efficiency in cutting.

Though an example in which control circuit 11 switches the drive sequence itself in accordance with a region where the tip end of cutting tool 5 is located has been shown, limitation thereto is not intended. For example, control circuit 11 may change a parameter such as an angle of rotation, an angular rotation speed, and the number of times of repetition of the drive pattern adopted in the drive sequence in accordance with a region where the tip end of cutting tool 5 is located, without switching the drive sequence itself.

As set forth above, root canal treatment instrument 100 according to the present modification can drive cutting tool 5 in accordance with a drive pattern in conformity with a shape or a condition of a root canal by carrying out control for switching a drive sequence or changing a parameter of the drive pattern included in the drive sequence in accordance with a region resulting from division of a root canal of a tooth into a plurality of regions, and can appropriately cut the root canal of the tooth. Control portion 11 can carry out control for switching the drive sequence in accordance with a region by providing a first switch position between the A region and the B region and providing a second switch position also between the B region and the C region.

Control portion 11 may have only a simple rotary motion driven in a cutting direction in a region above the A region and may switch to a motion described in the modification from the A region.

(Other Modifications)

Figure 17:
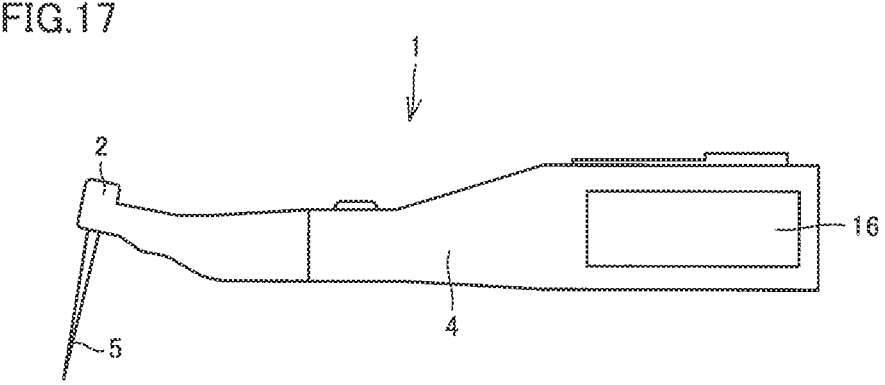
FIG. 17 is a schematic diagram showing a construction of a root canal treatment instrument of a cordless type.

Though the configuration of root canal treatment instrument 100 according to the first to fourth embodiments in which handpiece 1 is coupled to control box 9 through hose 61 has been described, the present invention is not limited as such and may be configured as a root canal treatment instrument of a cordless type. FIG. 17 is a schematic diagram showing a configuration of the root canal treatment instrument of the cordless type. The root canal treatment instrument of the cordless type shown in FIG. 17 incorporates a battery pack, a micromotor, and a control system corresponding to a control box in grip portion 4 of handpiece 1, with various operation buttons being provided on a surface of grip portion 4. The root canal treatment instrument of the cordless type further includes display portion 16 in grip portion 4. Therefore, an operator can check information such as whether cutting tool 5 is driven in the cutting direction or in the non-cutting direction, where cutting tool 5 is currently located, how much load is applied to cutting tool 5, or how high the number of rotations is, without greatly changing a line of sight. Though not shown, lead 19 for mouth cavity electrode 19a may be pulled out of grip portion 4.

Though micromotor 7 is employed as a source of motive power for driving cutting tool 5 in root canal treatment instrument 100 according to the first to fourth embodiments, the present invention is not limited as such and another drive source such as an air motor may be provided.

Root canal treatment instrument 100 according to the first to fourth embodiments may be configured such that setting portion 14 shown in FIG. 4 sets at least one set value from a recipe storing set values such as a drive sequence, a switch load, a switch position, a reference load, and a reference position. For example, setting portion 14 may be configured to automatically set a set value such as a drive sequence from a predetermined recipe by selecting a sex or a height of a patient. Setting portion 14 may be configured to store in advance a set value such as a drive sequence preferred by an operator as a recipe or store in advance a set value such as a drive sequence optimal for each patient as a recipe.

Root canal treatment instrument 100 according to the first to fourth embodiments may be configured such that, depending on a type of cutting tool 5 held by head 2, set values such as a drive sequence, a switch load, a switch position, a reference load, and a reference position are stored in advance in setting portion 14 as a recipe and an operator sets a set value such as a drive sequence by reading the recipe from setting portion 14 based on a type of cutting tool 5 held by head 2. Naturally, setting portion 14 may be configured to set a set value such as a drive sequence by providing a sensor capable of identifying a type of cutting tool 5 in head 2 and reading a stored recipe based on a result of detection by the sensor.

Features of root canal treatment instrument 100 according to the first to fourth embodiments may be combined as appropriate. For example, root canal treatment instrument 100 based on combination of the third embodiment and the fourth embodiment may select a drive sequence or change a parameter of a drive pattern included in the drive sequence in accordance with a load applied to cutting tool 5 detected by the load detector and a position of cutting tool 5 detected by root canal length measurement circuit 12.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A dental treatment apparatus comprising:
a handpiece holding a cutting tool in its head in a drivable manner;
a drive motor driving the cutting tool held by the head; and
a control circuit controlling the drive motor in accordance with any one of a first drive sequence, a second drive sequence, and a third drive sequence,
the first drive sequence consisting of combination of a first drive pattern in which an angle of rotation in drive in a cutting direction is greater than an angle of rotation in drive in a noncutting direction, and a second drive pattern in which an angle of rotation in drive in the cutting direction is smaller than an angle of rotation in drive in the noncutting direction,
the second drive sequence consisting of combination of a third drive pattern in which an angle of rotation in drive in the cutting direction is as great as an angle of rotation in drive in the noncutting direction, and the second drive pattern, and
the third drive sequence consisting of combination of the first drive pattern, and the third drive pattern.

2. The dental treatment apparatus according to claim 1, wherein
at least one parameter of the angle of rotation, an angular rotation speed, and a number of repetitions times of repetition is predetermined in each of the first drive pattern, the second drive pattern, and the third drive pattern.

3. The dental treatment apparatus according to claim 2, wherein
a difference between the angle of rotation in drive in the cutting direction and the angle of rotation in drive in the non-cutting direction in a repetition is different for each of the first drive pattern, the second drive pattern, and the third drive pattern.

4. The dental treatment apparatus according to claim 2, wherein
the number repetitions of at least one of the first drive pattern, the second drive pattern, and the third drive pattern is predetermined based on a first condition, and
the first condition is that an accumulated difference value representing accumulation of differences between the angle of rotation in drive in the cutting direction and the angle of rotation in drive in the non-cutting direction for each drive pattern exceeds a set value.

5. The dental treatment apparatus according to claim 2, wherein
in the first drive pattern, a ratio between the angle of rotation in drive in the cutting direction and the angle of rotation in drive in the non-cutting direction is from 6:1 to 6:5, and
in the second drive pattern, a ratio between the angle of rotation in drive in the cutting direction and the angle of rotation in drive in the non-cutting direction is from 2:3 to 1:3.

6. The dental treatment apparatus according to claim 1, wherein
the control circuit controls the drive motor further in accordance with a symmetric drive pattern in which the angle of rotation in drive in the cutting direction and the angle of rotation in drive in the non-cutting direction are equal to each other and an asymmetric drive pattern in which the angle of rotation in drive in the cutting direction and the angle of rotation in drive in the non-cutting direction are different from each other.

7. The dental treatment apparatus according to claim 6, wherein
in the symmetric drive pattern, the number of repetitions is set to two or more.

8. The dental treatment apparatus according to claim 2, wherein
in the plurality of drive patterns, presence or absence of a stop operation between drives is also predetermined in each of the first drive pattern, the second drive pattern, and the third drive pattern as the at least one parameter.

9. The dental treatment apparatus according to claim 2, the dental treatment apparatus further comprising an input button with which a parameter predetermined in each of the first drive pattern, the second drive pattern, and the third drive pattern is input, wherein
the input button can accept an input of the parameter from a user.

10. The dental treatment apparatus according to claim 1, wherein
the control circuit is configured to
store the first drive sequence, the second drive sequence, and the third drive sequence in a memory, and
select the drive sequence used for control of the drive motor from among the first drive sequence, the second drive sequence, and the third drive sequence stored in the memory.

11. The dental treatment apparatus according to claim 10, the dental treatment apparatus further comprising an operation button with which the drive sequence selected can be set through an operation by a user.

12. The dental treatment apparatus according to claim 1, the dental treatment apparatus further comprising a load detector detecting a load applied to the cutting tool, wherein
the control circuit changes a parameter of at least one drive pattern included in any one of a first drive sequence, a second drive sequence, and a third drive sequence used for control of the drive motor in accordance with the load applied to the cutting tool and detected by the load detector.

13. The dental treatment apparatus according to claim 12, wherein
the control circuit controls drive to set drive in the non-cutting direction or drive for stopping an operation when the load applied to the cutting tool and detected by the load detector is equal to or higher than a reference load.

14. The dental treatment apparatus according to claim 1, the dental treatment apparatus further comprising a position detector detecting a position of a tip end of the cutting tool in a root canal obtained through electric measurement of a length of a root canal, wherein
the control circuit changes at least one drive pattern included in any one of a first drive sequence, a second drive sequence, and a third drive sequence used for control of the drive motor in accordance with the position detected by the position detector.

15. The dental treatment apparatus according to claim 14, wherein
the control circuit controls drive to set drive in the non-cutting direction or drive for stopping an operation when the position detected by the position detector reaches a reference position.

16. The dental treatment apparatus according to claim 1, wherein
the first drive pattern has drive in the cutting direction and drive in the non-cutting direction, and
the second drive pattern has at least one of drive in the cutting direction and drive in the non-cutting direction and is different from the first drive pattern.

17. A method of driving a dental treatment apparatus driving a cutting tool held by a head of a handpiece of the dental treatment apparatus, the method comprising:
driving the cutting tool using a control circuit in accordance with any one of a first drive sequence, a second drive sequence, and a third drive sequence,
the first drive sequence consisting of combination of a first drive pattern in which an angle of rotation in drive in a cutting direction is greater than an angle of rotation in drive in a noncutting direction, and a second drive pattern in which an angle of rotation in drive in the cutting direction is smaller than an angle of rotation in drive in the noncutting direction,
the second drive sequence consisting of combination of a third drive pattern in which an angle of rotation in drive in the cutting direction is as great as an angle of rotation in drive in the noncutting direction, and the second drive pattern, and
the third drive sequence consisting of combination of the first drive pattern, and the third drive pattern.

* * * * *